(12) United States Patent
Niess et al.

(10) Patent No.: US 11,391,392 B2
(45) Date of Patent: Jul. 19, 2022

(54) VALVE WITH REINFORCEMENT PORTS AND MANUALLY REMOVABLE SCRUBBER

(71) Applicant: Rain Bird Corporation, Azusa, CA (US)

(72) Inventors: Peter Michael Niess, Vail, AZ (US); Kevin James Markley, Tucson, AZ (US); Leonard Francisco Challenger, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 144 days.

(21) Appl. No.: 16/556,315

(22) Filed: Aug. 30, 2019

(65) Prior Publication Data
US 2019/0383418 A1    Dec. 19, 2019

Related U.S. Application Data

(62) Division of application No. 15/960,129, filed on Apr. 23, 2018, now abandoned.

(51) Int. Cl.
| | |
|---|---|
| *F16K 31/40* | (2006.01) |
| *F16K 51/00* | (2006.01) |
| *B08B 1/00* | (2006.01) |
| *F16K 7/17* | (2006.01) |
| *F16K 27/02* | (2006.01) |
| *B08B 9/00* | (2006.01) |

(52) U.S. Cl.
CPC ............ *F16K 31/402* (2013.01); *B08B 1/005* (2013.01); *F16K 7/17* (2013.01); *F16K 51/00* (2013.01); *B08B 9/00* (2013.01); *F16K 27/0236* (2013.01)

(58) Field of Classification Search
CPC .......... F16K 31/402; F16K 51/00; F16K 7/17; F16K 27/0236; B08B 1/005; B08B 9/00
See application file for complete search history.

(56) References Cited

U.S. PATENT DOCUMENTS

| | | | | |
|---|---|---|---|---|
| 1,679,779 | A | ‡ | 8/1928 | Oberhuber ................ F16K 1/36 251/33 |
| 2,166,402 | A | ‡ | 7/1939 | Gora ..................... F16L 37/127 285/316 |

(Continued)

OTHER PUBLICATIONS

Hunter®, ICV Valve Features & Specifications Brochure, <hunterindustries.com>, 2017, 2 pages.

(Continued)

*Primary Examiner* — Matthew W Jellett
*Assistant Examiner* — Christopher D Ballman
(74) *Attorney, Agent, or Firm* — Fitch, Even, Tabin & Flannery, LLP

(57) ABSTRACT

There is provided an irrigation valve with embedded rings for reinforcement of valve ports. The valve has a valve body and threaded flow paths, the flow paths including an outlet and an inlet on opposite sides of the valve body. Irrigation piping is attached to the inlet and to the outlet. The reinforcement rings at the inlet and the outlet prevent fracturing of the valve body and/or piping due to overtightening of the piping. Further provided is a scrubber for an irrigation valve. The scrubber and frees debris on a filter. The scrubber may be manually extracted for maintenance or replacement without the need for mechanical tools.

9 Claims, 25 Drawing Sheets

(56) References Cited

U.S. PATENT DOCUMENTS

| | | | | | |
|---|---|---|---|---|---|
| 2,302,930 | A | ‡ | 11/1942 | Anderson | F16K 7/126 251/33 |
| 2,317,376 | A | ‡ | 4/1943 | Grove | G05D 16/10 251/5 |
| 2,338,760 | A | ‡ | 1/1944 | Deming | G05D 16/0402 137/50 |
| 2,567,071 | A | ‡ | 9/1951 | Jacobus | F02M 59/00 137/53 |
| 2,615,471 | A | ‡ | 10/1952 | McFarland, Jr. | F16K 7/12 251/33 |
| 2,659,565 | A | ‡ | 11/1953 | Johnson | F16K 41/10 251/33 |
| 2,716,017 | A | ‡ | 8/1955 | Linker | F16K 7/126 251/33 |
| 2,742,785 | A | ‡ | 4/1956 | St Clair | G01F 3/225 73/279 |
| 2,812,777 | A | ‡ | 11/1957 | Dahl | F16K 7/16 92/102 |
| 2,819,013 | A | ‡ | 1/1958 | Paasche | F04B 39/102 137/56 |
| 2,918,089 | A | ‡ | 12/1959 | McFarland, Jr. | F16K 7/126 251/33 |
| 2,947,325 | A | ‡ | 8/1960 | McFarland, Jr. | B29C 66/712 251/33 |
| 3,011,758 | A | ‡ | 12/1961 | McFarland, Jr. | F16K 7/126 251/33 |
| 3,020,020 | A | ‡ | 2/1962 | Boteler | F16K 7/123 251/33 |
| 3,118,646 | A | ‡ | 1/1964 | Markey | F16K 31/402 251/5 |
| 3,130,954 | A | ‡ | 4/1964 | McFarland, Jr. | F16K 7/126 251/33 |
| 3,154,286 | A | ‡ | 10/1964 | McFarland, Jr. | F16K 7/126 251/33 |
| 3,218,978 | A | ‡ | 11/1965 | Kalert, Jr. | F02M 1/00 417/39 |
| 3,412,974 | A | ‡ | 11/1968 | Harris | F16K 7/123 251/33 |
| 3,522,926 | A | ‡ | 8/1970 | Bryant | F16K 7/075 251/5 |
| 3,526,386 | A | ‡ | 9/1970 | Gachot | F16K 27/047 251/36 |
| 3,532,265 | A | ‡ | 10/1970 | Baram | B04B 1/18 494/27 |
| 3,561,307 | A | ‡ | 2/1971 | Mortensen | E04B 1/4121 411/43 |
| 3,614,137 | A | ‡ | 10/1971 | Jacobson | F16L 15/006 285/39 |
| 3,777,771 | A | ‡ | 12/1973 | De Visscher | F16L 29/04 137/1 |
| 3,825,030 | A | ‡ | 7/1974 | Kalsi | F16K 27/065 137/375 |
| 3,827,456 | A | ‡ | 8/1974 | Sheppard | B60K 15/0406 137/85 |
| 3,990,675 | A | ‡ | 11/1976 | Bonafous | F16K 1/22 251/148 |
| 4,029,296 | A | ‡ | 6/1977 | Hartmann | F16K 7/126 251/33 |
| 4,044,793 | A | ‡ | 8/1977 | Krueger | A61M 16/044 137/88 |
| 4,081,171 | A | * | 3/1978 | Morgan | B01D 35/04 137/549 |
| 4,146,059 | A | ‡ | 3/1979 | Heilmann | F16L 47/20 138/10 |
| 4,180,239 | A | * | 12/1979 | Valukis | F16K 21/16 251/205 |
| 4,270,441 | A | ‡ | 6/1981 | Tuck, Jr. | F16J 3/02 92/102 |
| 4,348,006 | A | ‡ | 9/1982 | Schmitt | F16K 27/0218 251/28 |
| 4,360,037 | A | | 11/1982 | Kendall | |
| 4,493,339 | A | ‡ | 1/1985 | Porter, Jr. | A61M 16/208 128/20 |
| 4,596,265 | A | ‡ | 6/1986 | Goodell | B60T 15/54 137/10 |
| 4,606,374 | A | ‡ | 8/1986 | Kolenc | F16K 37/00 137/55 |
| 4,666,166 | A | ‡ | 5/1987 | Hart | F04B 43/0054 137/51 |
| 4,682,533 | A | ‡ | 7/1987 | Hafner | F16J 3/02 4/407 |
| 4,750,709 | A | ‡ | 6/1988 | Kolenc | F16K 41/12 137/55 |
| 4,759,530 | A | ‡ | 7/1988 | Iff | F16K 1/2265 251/214 |
| 4,830,333 | A | ‡ | 5/1989 | Watson | F16K 31/0658 251/129.18 |
| 4,981,155 | A | ‡ | 1/1991 | Pick | F16K 31/404 134/16 |
| 4,988,077 | A | ‡ | 1/1991 | Conley | F16K 5/045 251/30 |
| 5,031,875 | A | ‡ | 7/1991 | Zimmerman | F16J 3/02 251/61 |
| 5,076,541 | A | ‡ | 12/1991 | Daghe | F16K 5/0642 251/30 |
| 5,100,103 | A | ‡ | 3/1992 | Conley | F16K 27/065 251/30 |
| 5,186,615 | A | ‡ | 2/1993 | Karliner | F04B 43/067 417/38 |
| 5,222,850 | A | ‡ | 6/1993 | Medal | B29C 65/08 285/21 |
| 5,261,798 | A | ‡ | 11/1993 | Budde | F04B 9/135 417/39 |
| 5,291,822 | A | ‡ | 3/1994 | Alsobrooks | F16J 3/02 92/93 |
| 5,443,083 | A | ‡ | 8/1995 | Gotthelf | B60K 15/03006 137/34 |
| 5,529,280 | A | ‡ | 6/1996 | Satoh | F16K 7/17 251/33 |
| 5,716,081 | A | ‡ | 2/1998 | Leigh-Monstevens | F16L 37/088 137/614.03 |
| 5,836,571 | A | ‡ | 11/1998 | Streitman | B60T 15/36 251/33 |
| 5,865,423 | A | ‡ | 2/1999 | Barber | F16K 41/12 251/33 |
| 5,964,247 | A | * | 10/1999 | Johnson | E03D 1/32 137/414 |
| 5,964,446 | A | ‡ | 10/1999 | Walton | G05D 16/0633 137/55 |
| 5,996,608 | A | * | 12/1999 | Hunter | F16K 31/402 137/244 |
| 6,068,718 | A | ‡ | 5/2000 | Medal | B29C 65/08 156/30 |
| 6,068,901 | A | ‡ | 5/2000 | Medal | B29C 65/08 156/58 |
| 6,079,437 | A | * | 6/2000 | Beutler | F16K 31/385 137/181 |
| 6,092,550 | A | ‡ | 7/2000 | Gotch | F16K 7/16 137/33 |
| 6,095,484 | A | ‡ | 8/2000 | Frenkel | F16K 7/126 137/48 |
| 6,102,071 | A | ‡ | 8/2000 | Walton | G05D 16/0633 137/54 |
| 6,155,535 | A | ‡ | 12/2000 | Marcilese | F16K 7/126 251/33 |
| 6,189,861 | B1 | ‡ | 2/2001 | Gotch | F16K 7/16 251/33 |
| 6,257,287 | B1 | ‡ | 7/2001 | Kippe | B60K 15/03504 137/202 |
| 6,295,918 | B1 | ‡ | 10/2001 | Simmons | F04B 43/0054 92/98 R |
| 6,394,412 | B2 | ‡ | 5/2002 | Zakai | F16K 31/402 137/487.5 |
| 6,575,187 | B2 | ‡ | 6/2003 | Leys | F16K 11/048 137/15.21 |

(56) References Cited

U.S. PATENT DOCUMENTS

| | | | | |
|---|---|---|---|---|
| 6,848,632 B2 * | 2/2005 | Clark | B05B 15/74 | 239/203 |
| 7,059,578 B2 ‡ | 6/2006 | Frenkel | F16K 7/126 | 251/61 |
| 7,168,675 B2 ‡ | 1/2007 | Cabuz | F16K 31/02 | 251/12 |
| 7,201,187 B2 ‡ | 4/2007 | Irwin | F16K 7/17 | 137/62 |
| 7,250,003 B2 ‡ | 7/2007 | Thompson | F16B 37/14 | 264/27 |
| 7,252,110 B2 ‡ | 8/2007 | Semeia | F16K 15/148 | 128/20 |
| 7,370,664 B2 ‡ | 5/2008 | Glime | F16K 1/34 | 137/37 |
| 7,503,348 B2 ‡ | 3/2009 | Irwin | F16K 7/17 | 137/62 |
| 7,527,241 B2 ‡ | 5/2009 | Lodolo | F16K 7/126 | 137/54 |
| 7,571,892 B2 ‡ | 8/2009 | Newberg | F16K 27/07 | 251/14 |
| 7,634,962 B2 ‡ | 12/2009 | Muller | F16K 7/12 | 92/103 |
| 7,647,861 B2 ‡ | 1/2010 | Bessman | F16J 3/02 | 92/101 |
| 7,665,713 B1 ‡ | 2/2010 | Clark | F16K 7/075 | 251/4 |
| 7,694,934 B2 ‡ | 4/2010 | Irwin | F16K 31/402 | 137/24 |
| 7,896,751 B2 ‡ | 3/2011 | Thompson | F16B 37/14 | 470/18 |
| 8,235,352 B2 ‡ | 8/2012 | Irwin | F16K 31/402 | 251/14 |
| 8,307,840 B2 ‡ | 11/2012 | Kobayashi | B60K 15/03519 | 123/516 |
| 8,348,364 B2 * | 1/2013 | Taga | B41J 2/16532 | 347/7 |
| 8,408,515 B2 ‡ | 4/2013 | Yamamoto | G05D 16/0663 | 251/33 |
| 8,491,399 B2 ‡ | 7/2013 | Suefuji | B29C 70/865 | 264/13 |
| 8,651,132 B1 ‡ | 2/2014 | Hu | E03C 1/0403 | 137/315.12 |
| 8,671,964 B2 ‡ | 3/2014 | Py | A61M 39/18 | 137/1 |
| 8,794,595 B2 ‡ | 8/2014 | Reed | F16K 7/126 | 137/55 |
| 8,807,158 B2 ‡ | 8/2014 | Harris | B01F 5/0413 | 137/37 |
| 9,016,307 B2 ‡ | 4/2015 | Matalon | F16K 7/126 | 137/31 |
| 9,109,707 B2 ‡ | 8/2015 | Goulding | F16J 15/10 | |
| 9,151,256 B2 ‡ | 10/2015 | Matsuo | F02M 37/0029 | |
| 9,157,534 B2 ‡ | 10/2015 | Matalon | F16K 7/126 | |
| 9,239,119 B2 ‡ | 1/2016 | Morris | F16K 7/17 | |
| 9,322,482 B2 ‡ | 4/2016 | Matalon | F16K 7/126 | |
| 9,328,829 B2 ‡ | 5/2016 | Fukano | F16K 7/12 | |
| 9,371,925 B2 ‡ | 6/2016 | Vasquez | G05D 16/0663 | |
| 9,422,968 B2 ‡ | 8/2016 | Thompson | F16B 37/14 | |
| 9,423,037 B2 ‡ | 8/2016 | Obara | F16J 3/02 | |
| 9,441,745 B2 ‡ | 9/2016 | Vasquez | F16K 7/12 | |
| 9,739,367 B2 ‡ | 8/2017 | Kujawski, Jr. | F16H 61/0009 | |
| 10,562,056 B2 | 2/2020 | Zimmerman | | |
| 2006/0266961 A1 ‡ | 11/2006 | Frenkel | F16K 7/126 | 251/61 |
| 2007/0075284 A1 ‡ | 4/2007 | Masamura | F16K 7/17 | 251/63.5 |
| 2008/0166204 A1 ‡ | 7/2008 | Nilsen | B29C 45/14418 | 411/37 |
| 2008/0210312 A1 ‡ | 9/2008 | Glime | F16K 1/34 | 137/37 |
| 2009/0095935 A1 ‡ | 4/2009 | Wlodarczyk | F16K 31/402 | 251/33 |
| 2011/0272611 A1 ‡ | 11/2011 | Huang | F16K 27/0236 | 251/129.15 |
| 2011/0272614 A1 ‡ | 11/2011 | Yamamoto | F02M 21/0236 | 251/32 |
| 2013/0008542 A1 * | 1/2013 | Irwin | G01F 1/075 | 137/859 |
| 2013/0014639 A1 ‡ | 1/2013 | Takeshita | F15B 1/125 | 92/96 |
| 2014/0264103 A1 ‡ | 9/2014 | Pressley | F16K 31/126 | 251/61 |
| 2015/0108386 A1 ‡ | 4/2015 | Obara | F16J 3/02 | 251/33 |
| 2015/0144822 A1 ‡ | 5/2015 | Akamoto | F16K 7/123 | 251/21 |
| 2016/0053899 A1 ‡ | 2/2016 | Glime | F16K 7/16 | 251/33 |
| 2016/0239028 A1 ‡ | 8/2016 | Vasquez | F16K 17/044 | |
| 2016/0305582 A1 ‡ | 10/2016 | Blomberg | F16L 13/02 | |
| 2017/0334111 A1 ‡ | 11/2017 | Martin | B29C 45/14819 | |
| 2020/0116271 A1 | 4/2020 | Nguyen | | |

OTHER PUBLICATIONS

Hunter®, ICV-301 3in Valve, at least known prior to Apr. 23, 2018, 4 pages.

Hunter®, Product Information, PGV Valves: Rugged, Professional-Grade Valves Designed to Handle the Full Range of Landscape Needs, 2003, 18 pages.

Rain Bird Corporation, Photographs 1-6 of PESB valve and components thereof publicly available more than one year prior to Apr. 23, 2018.

\* cited by examiner
‡ imported from a related application

VALVE WITH REINFORCEMENT PORTS AND MANUALLY REMOVABLE SCRUBBER

CROSS-REFERENCE TO RELATED APPLICATIONS

This application is a divisional of and claims priority to prior application Ser. No. 15/960,129, filed Apr. 23, 2018, which is hereby incorporated herein by reference in its entirety.

FIELD

The subject matter of this application relates to improvements of valves, more particularly, to reinforced valve ports and manually removable filter scrubbers.

BACKGROUND

Irrigation valves in an irrigation system are used to control the flow of water to emission devices, which distribute water to vegetation. Valves can be standalone valves that control water flow through irrigation piping. Valves are used with main supply lines and zone lines that have one or more emission devices.

Valves are often required to handle water flow rates in the pipes reaching approximately 300 gallons/minute. Therefore, the valves need to be securely fastened to the pipes to avoid leakage; however, overtightening of the pipes can lead to cracks in the valve body and/or the piping. The irrigation pipes and/or fittings are threaded into valve ports extending from the valve body. It is desired to have reinforced valve ports to avoid fracturing of the valve body due to overtightening.

Additionally, the water entering the valves may include debris, such as sand, grit or algae. A valve may have a filter in the valve body to capture debris before it can enter other areas of the valve where the debris cannot pass through, thereby avoiding clogging passageways. The filter may have holes or slots to prevent passage of debris; however, the holes or slots themselves may become clogged or blocked over time. Thus, a scrubber may be used to break up and free debris trapped on the filter.

Scrubbers may require maintenance in the field or even replacement due to degradation over time. In general, scrubbers may be fixed in place to the valve body via a screw or screws; however, if the scrubber is damaged or needs routine maintenance, then it may be cumbersome to extract the scrubber from the valve as it can require inserting a tool into delicate and small areas of the valve. Therefore, it is desired to have a scrubber that can be easily removed manually at the valve without the need for tools and without the need to remove the valve.

DETAILED DESCRIPTION

Figure 1:
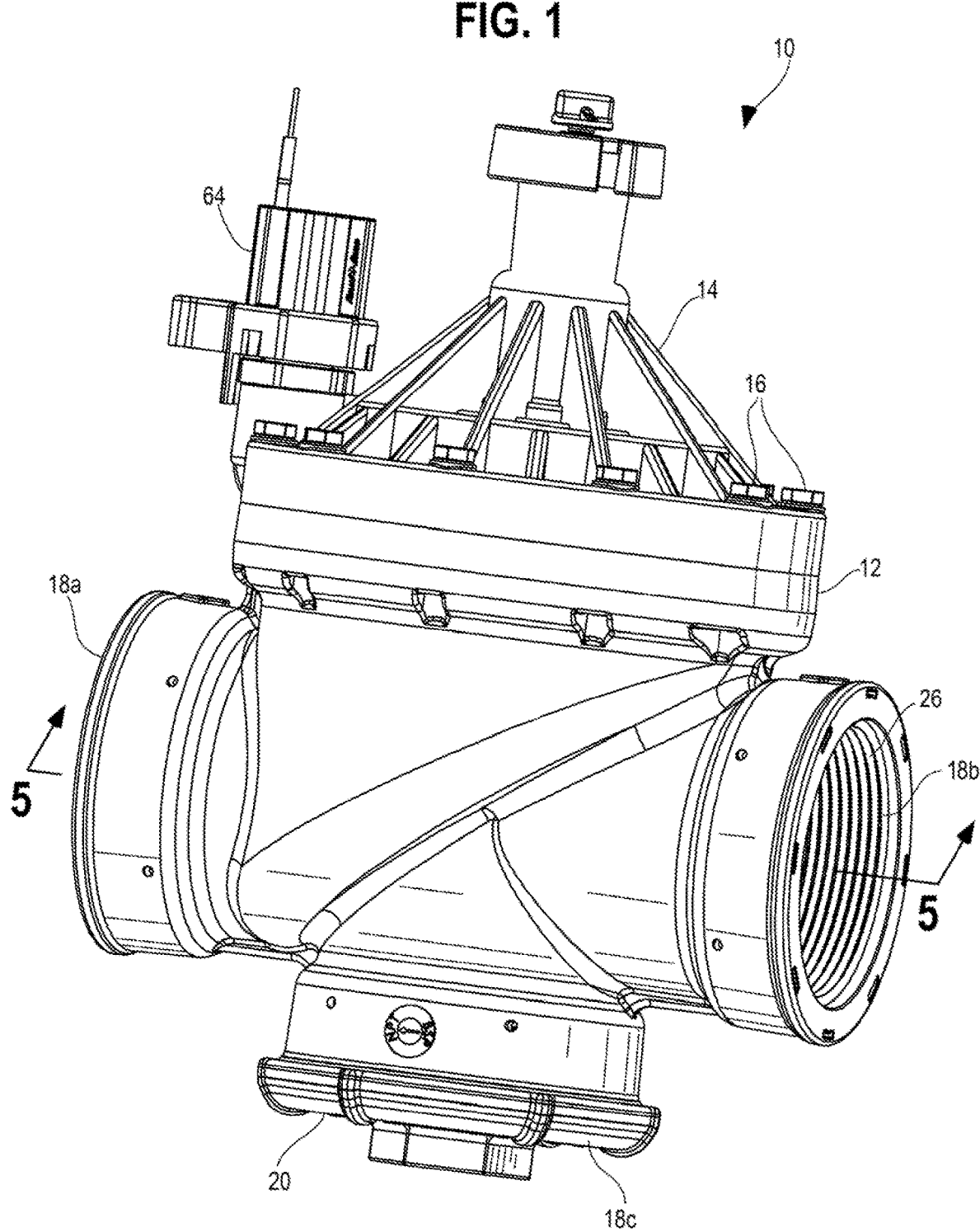
FIG. 1 is a side perspective view of an irrigation valve.
Figure 4:
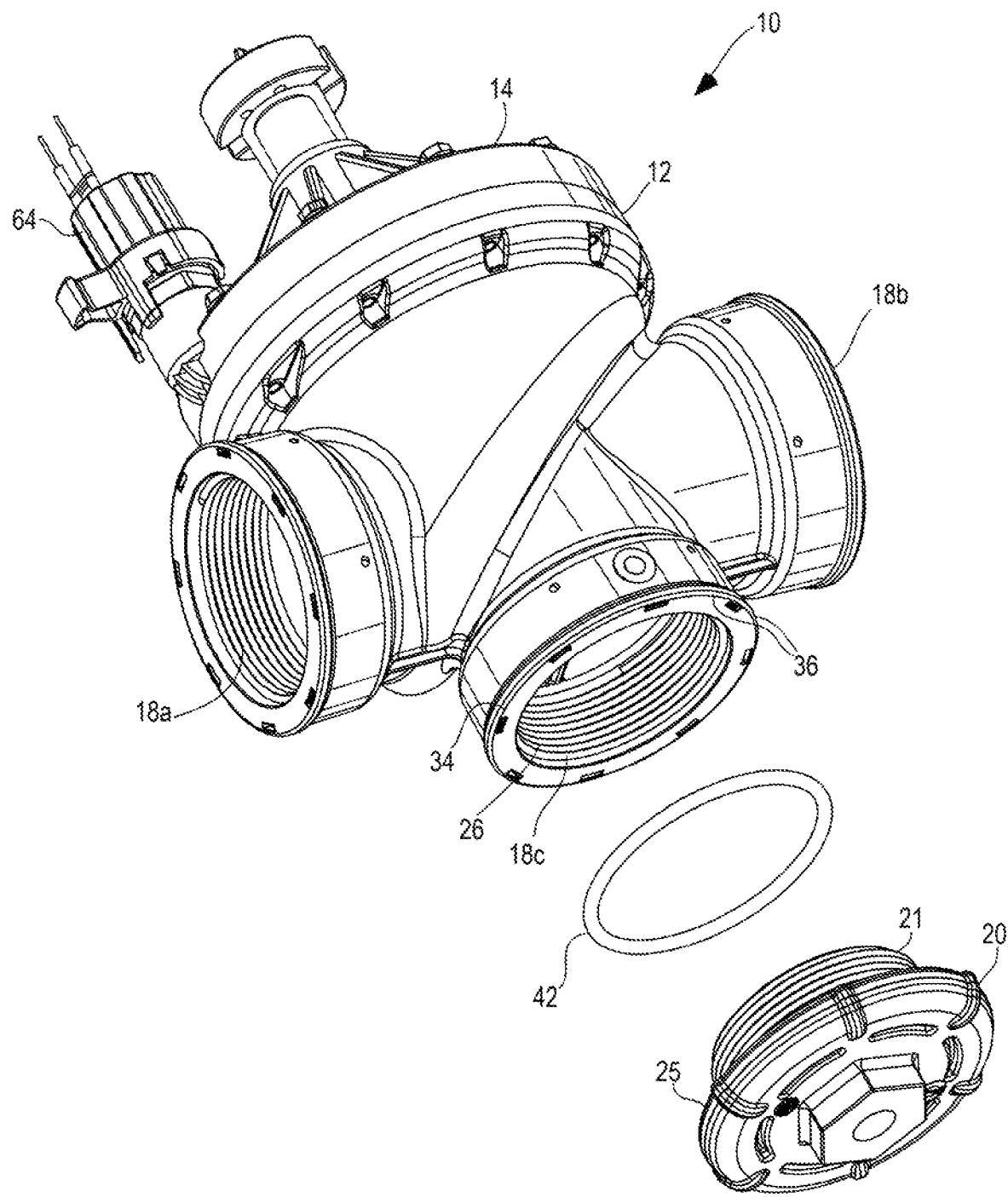
FIG. 4 is an exploded bottom perspective view of the irrigation valve of FIG. 1 showing a plug and an o-ring associated with the valve body.

With reference to FIG. 1, there is illustrated a valve 10 with a valve body 12 and a bonnet 14. The bonnet 14 is attached to the valve body 12 with screws 16. The valve body 12 includes an outlet 18a, an inlet 18b opposite the outlet 18a, and an inlet 18c at the bottom of the valve body 14. Each of the inlets and outlet 18a,b,c include internal threads 26. In a typical irrigation system, a pipe is connected to the outlet 18a and one of the two threaded inlets 18b,c. The unused inlet is closed with a plug 20 having a threading 21 (FIG. 4). For example, the flow path that is located upstream has the irrigation piping threaded into the inlet 18b for water to flow into the valve 10. The flow path threaded into the outlet 18a for water to flow out of the valve 10 and into the piping. The plug 20 is threaded into the other inlet 18c.

In many instances, the valve 10 is attached to a main irrigation supply line as well as some piping that supplies different irrigation zones. The valves often handle water flow rates as high as 300 gallons/minute. Therefore, it is desired that pipes be sufficiently secured to the valve 10 as to avoid leakage particularly at the outlet and inlets 18a,b,c.

However, overtightening to prevent leakage may result in cracking of the valve body 12 as well as the attached piping. Therefore, it is desired to reinforce the outlet and inlets 18a,b,c to prevent fracturing of the valve body 12 and/or piping.

Figure 2:
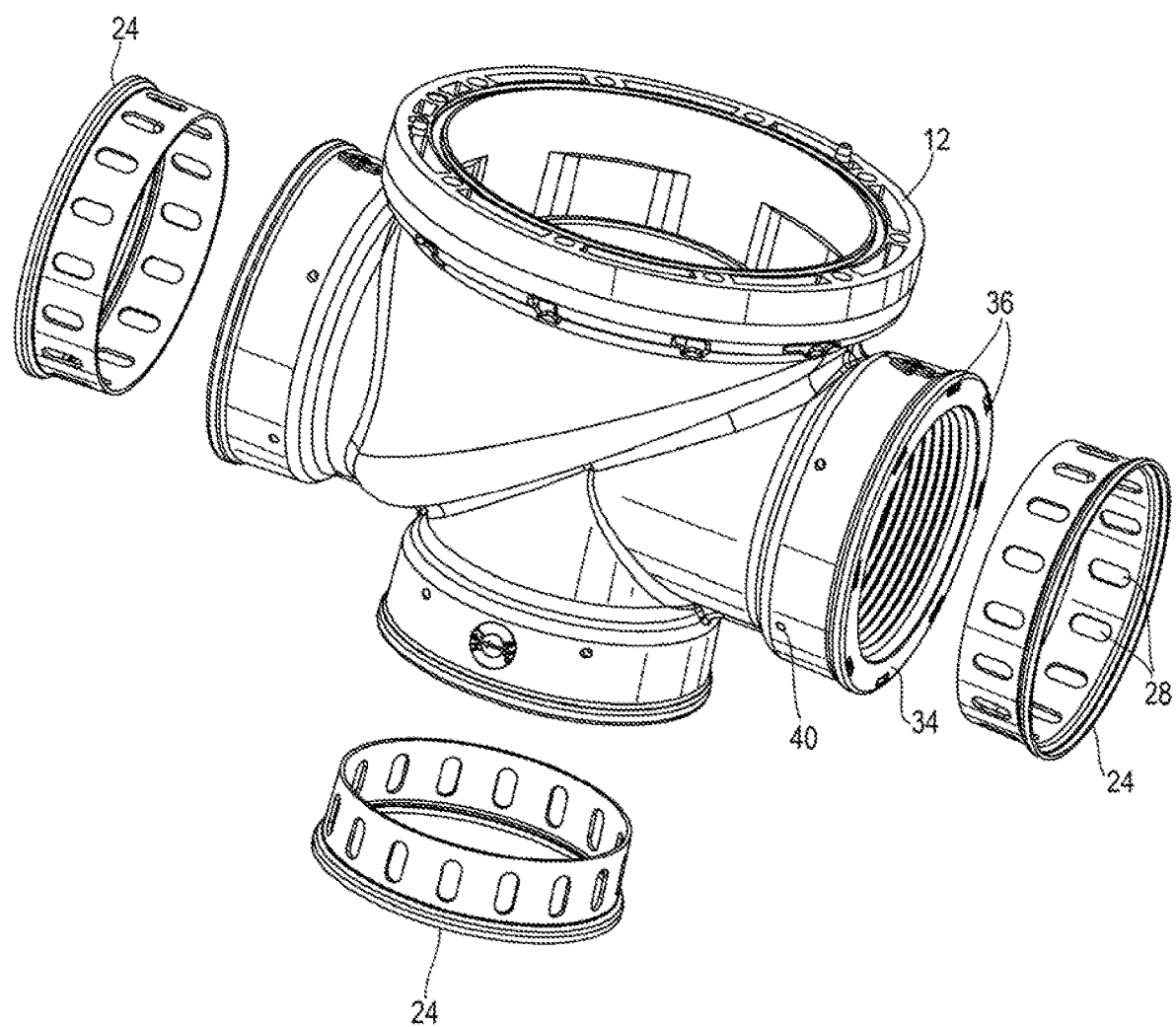
FIG. 2 is an exploded side perspective view of a valve body of the irrigation valve of FIG. 1 showing embedded reinforcement rings.

Referring to FIG. 2, an exploded view of the valve body 12 with reinforcement rings 24 is shown. The reinforcement rings 24 can be made of steel but also can be made of other materials, such as plastic, that add strength to the outlet and inlets 18a,b,c. Preferred materials are 17 gage 302/304 stainless or galvanized steel. The rings 24 are embedded into the walls of the outlet and inlets 18a,b,c. Holes 28 in the rings 24 allow plastic to fill in the area and lock the rings 24 into place. During the molding process, plastic flows into and through the holes 28. The holes 28 are shown oblong but could be any shape, including circular, triangular, and rectangular shape.

An annular face 34 of the outlet and inlets 18a,b,c has slots 36 spaced annularly about it. These slots 36 are formed by a molding tool that holds the rings 24 in place during molding. More specifically, the annular faces 34 of the outlet and inlets 18a,b,c allow for a molding device with teeth to be inserted slightly into the walls of the outlet and inlets 18a,b,c to hold the rings 24 in place as the plastic is being injected into the mold. The plastic flows around the tool holding the rings 24, and the slots 36 are formed where the tool is removed. After the mold is filled and the tool with the teeth is retracted, the rings 24 are set in place. The sides of the outlet and inlets 18a,b,c also include small depressions 40 formed by pins extending inward in the mold to provide further stabilization of the rings 24 during molding.

Referring to FIG. 4, the inlet 18c may be sealed with the plug 20. The plug 20 may be made of rubber, plastic, or any other material conducive to forming a seal to prevent water leakage. A preferred material is Nylon 6/6 35% Glass Reinforced which is commercially available from BASF as Ultramid® A3WG7. The plug 20 has threads 21 for connecting the plug 20 to the threads 26 of the inlet 18c or 18b. The annular face 34 of the outlet and inlets 18a,b,c supports an o-ring 42 that sits between the annular face 34 and the plug 20. The diameter of the o-ring 42 is smaller than the diameter of an imaginary circle on which the slots 36 sit at the annular face 34, and does not cover the slots 36. The o-ring 42 may be in the shape of a torus, and is preferably made of elastomeric material, such as rubber or plastic. The o-ring 42 seals the plug 20 to the inlet 18c to prevent leakage. Alternatively, the o-ring 42 may be seated on the face 34 of the side inlet 18b, and the plug 20 is threaded into the side inlet 18b. In this configuration, a pipe may be threaded into the bottom inlet 18c, forming a vertical inlet for water to flow into the valve body 12. In either case, the plug 20 includes an annular flange 25 that engages the o-ring 42 and compresses it against the face 34.

Figure 3:
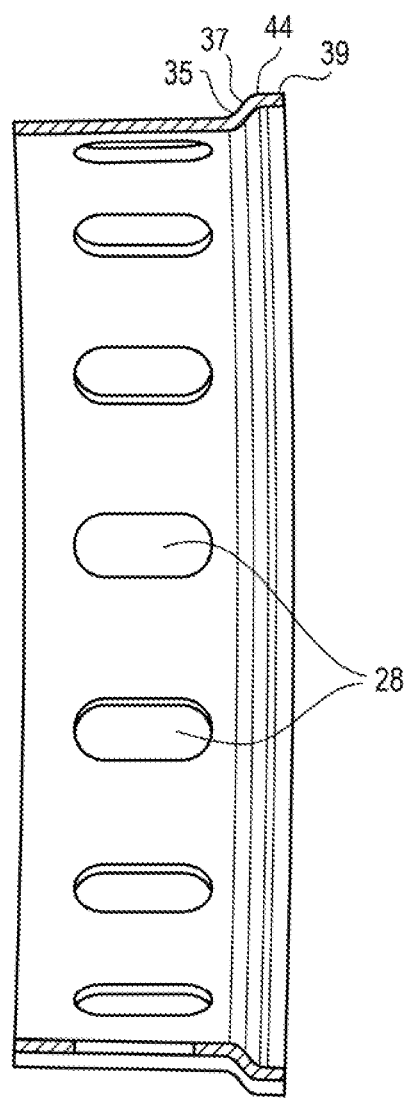
FIG. 3 is a cross-sectional view of one of the reinforcement rings of FIG. 2.

The position of the slots 36 in the face 34 is preferably closer to the outer diameter of the face 34 than the inner diameter of the face 34. This accommodates the placement of the o-ring 42 onto the face 34 in such a position as to help seal the plug 20. This configuration also inhibits the passage of water into the slots 36. Water entering the slots 36 could degrade the reinforcement rings 24 over time. The annular faces 34 have a slightly larger outer diameter than the threaded outlet and inlets 18a,b,c. Therefore, with the slots 36 disposed toward the outer diameter of the annular face 34, the embedded rings 24 have a radially outward lip 44 to extend up and in line with the slots 36, as shown in FIG. 3. The radially outward lip 44 has a first outward bend 35 followed by a second bend 37 that axially aligns the remainder 39 of the lip with the ring 24.

Alternatively, it would be possible to manufacture a steel ring that did not have a radially outward lip. For instance, a steel ring may have a uniform diameter extending straight through the valve body 12 from the slots 36 of the face 34, and the tooling used to set the rings would remain the same. This would provide reinforcement; however, this may place the slots 36 in a position that would result in unequal amounts of plastic at different locations on the inside and the outside of the rings 24, thus leading to increased stress on the rings 24. Having the ring located more centrally on the seating face 34 could interfere with the sealing of the plug 20 and the o-ring 42 against the seating face 34. While this version would still increase the strength of the inlets and outlet, the version above is preferred because the widening diameter of the outlet and inlets 18a,b,c permits having a similar amount of material on both the inner and outer surfaces of the reinforcement rings 24.

Figure 5:
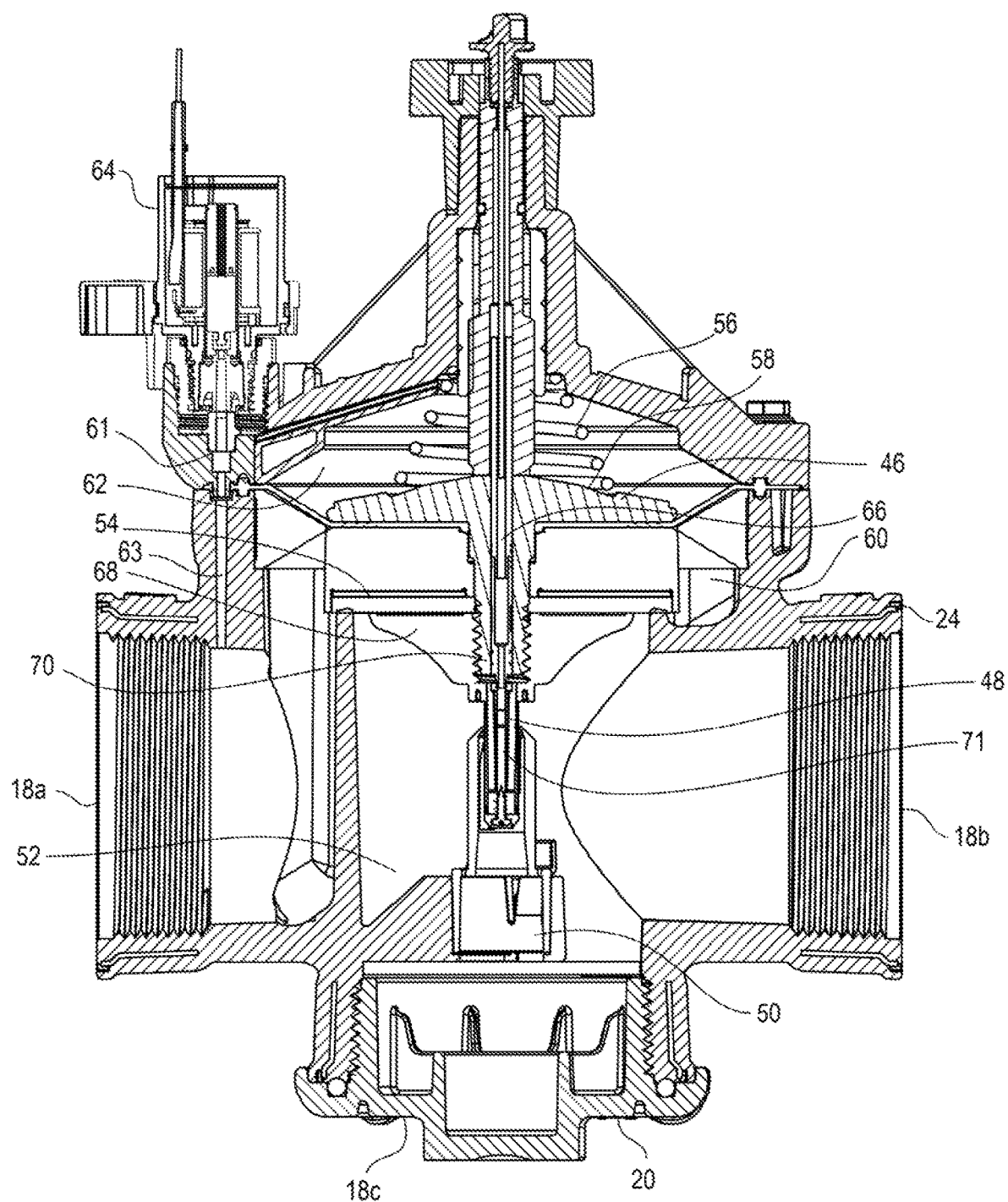
FIG. 5 is a cross-sectional view of the irrigation valve of FIG. 1 taken along line 5-5 of FIG. 1.

With reference to FIG. 5, the valve 10 includes a diaphragm assembly 46, a filter 48, and a scrubber 50. The embedded rings 24 are also seen over-molded with plastic around the threaded inlets 18b,c and outlet 18a, and the inlet 18c is sealed with the plug 20. As water flows through the inlet 18b, the water enters a main cavity 52. The pressure of the inflowing water pushes the diaphragm assembly 46 off a valve seat 54 if the pressure is sufficient to counteract the downward pressure from a spring 56 and any remaining pressure in a pressure chamber 62 pushing down on a top side 58 of the diaphragm assembly 46. A solenoid 164 can open a pilot valve 161 to release the water in the pressure chamber 162 allowing water to exit through a passage 163 to the outlet 118a and downward pressure on the diaphragm assembly to be decreased.

Furthermore, water in the main cavity 52 will also proceed through the filter 48 and into a passageway 66. This water enters the pressure chamber 62 to help close the valve 10 and maintain the valve 10 closed when the solenoid 64 and the pilot valve 61 prevent flow from the pressure chamber 62 through the passage 63 to the outlet 18a. The filter 48 has an upper portion 68 that threads on to a threaded stem portion 70 of the diaphragm assembly 46. The filter 48 blocks debris attempting to enter the passageway 66 that could otherwise cause blockage throughout the passageway 66. Such blockage could prevent the desired amount of water entering the pressure chamber 62. The filter includes holes 71 (or slots) that allow water to pass through, yet the holes 71 are of predetermined size and number to block debris from entering the passageway 66 while also allowing the appropriate amount of water flow.

Debris can encounter the filter 48 just from water containing debris flowing through the valve 10 and/or from being drawn into the filter 48 as it flows into the pressure chamber 62. Any debris that builds on the filter 48 can become trapped in the filter holes 71 and can impede performance of the valve 10, including the desired flow to the pressure chamber 62. The scrubber 50 scrubs the filter 48 as the diaphragm assembly 46 moves to break free any debris that may be on the filter or clogging the filter holes 71.

Figure 6:
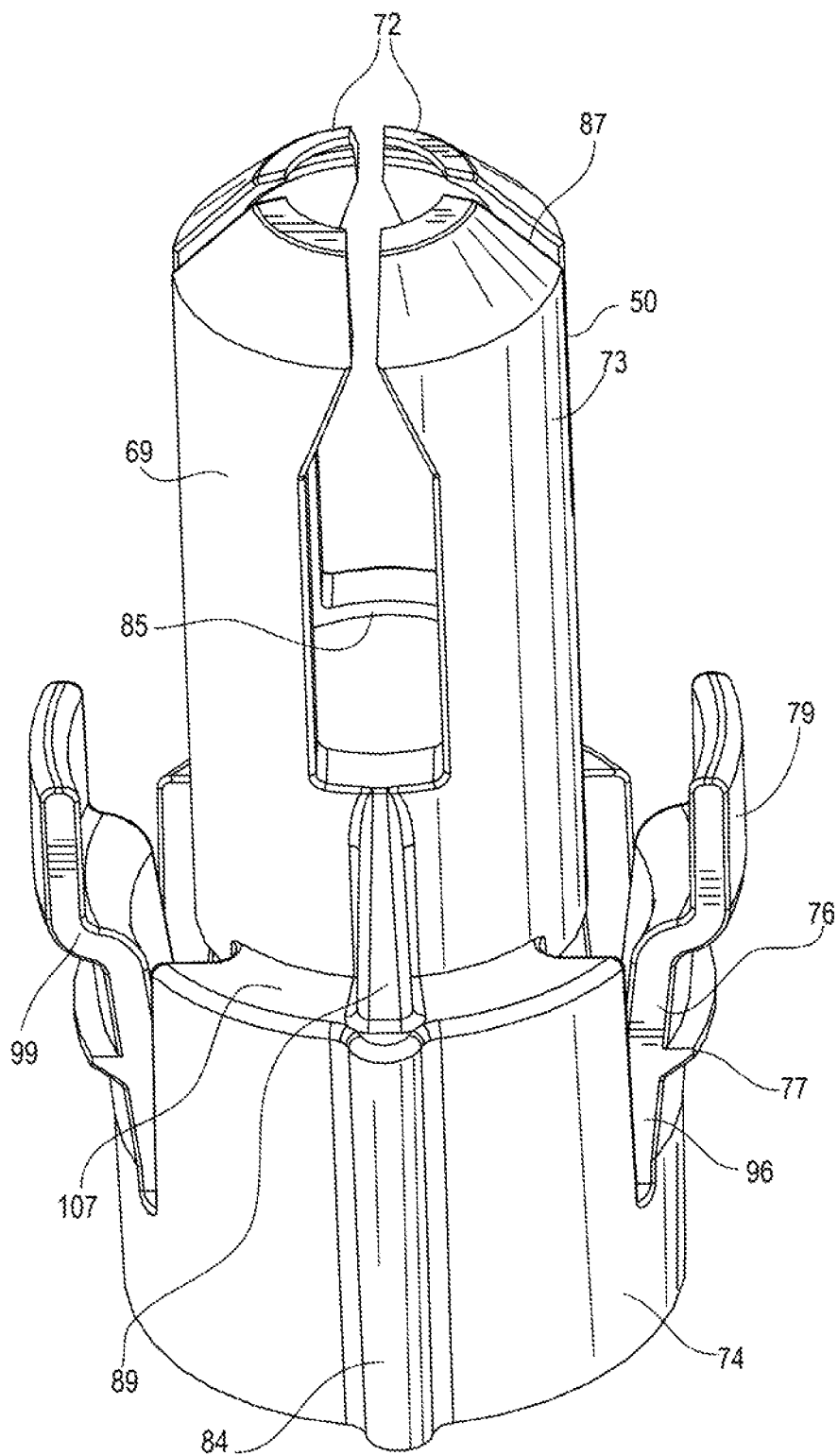
FIG. 6 is a side perspective view of a scrubber of the irrigation valve of FIG. 1.

As seen in FIG. 6, the scrubber 50 has an upper portion 73 with scrubber fingers 69 having arcuate edges 72 at the top of the fingers 69. The arcuate edges 72 match the arcuate outer profile of the filter 48 to scrape against the filter 48 as the filter 48 moves vertically up and down with the diaphragm assembly 46 during operation of the valve 10. The fingers 69 of the upper portion 73 are supported by stanchions 89. The stanchions 89 extend from a ledge 107 of a base portion 74 to the upper portion 73. The fingers 69 are separated by longitudinal finger grooves 87 and inlet ports 85 that enable the fingers 69 to flex in and out radially. The inlet ports 85 also allow water to pass into the filter 48 and then into the passageway 66. The base portion 74 of the scrubber 50 has wings 76, each wing 76 being moveable radially. The wings 76 each have a locking ledge 77 for attachment to the valve body 12 and a handle or tab 79 that enables one to manually move the wings 76 radially inward against an outward bias of the wings 76 to disengage the locking ledge 77 from the valve body 12 to remove the scrubber 50. The handles/tabs 79 extend away from the scrubber 150 to provide enhanced leverage in unlatching the locking ledge 77 for manual removal of the scrubber 50. The handles/tabs 79 are enlarged for easy location and manipulation by a user reaching into the valve body 12.

Figure 8:
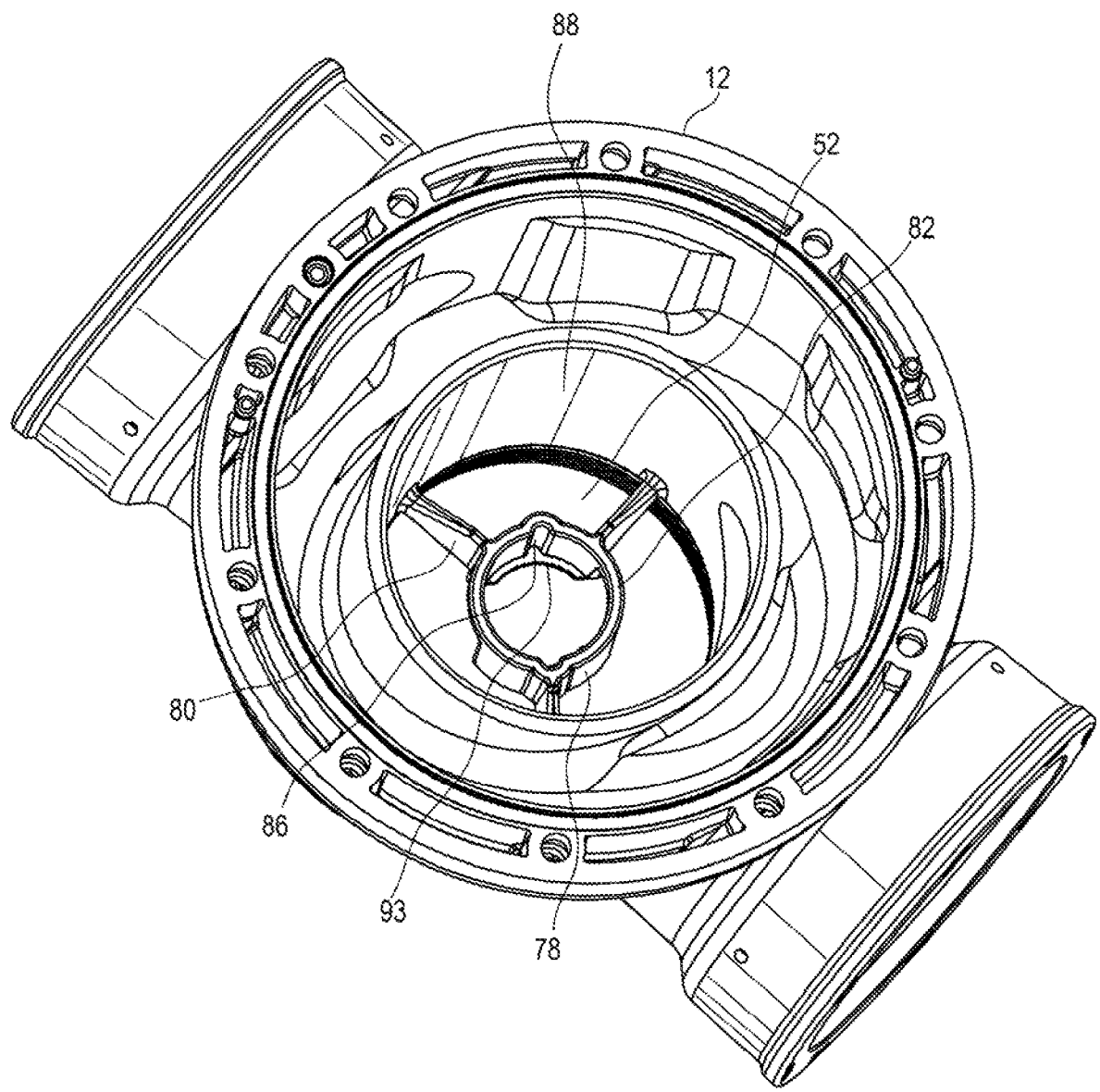
FIG. 8 is a top perspective view of the valve body of FIG. 2.
Figure 9:
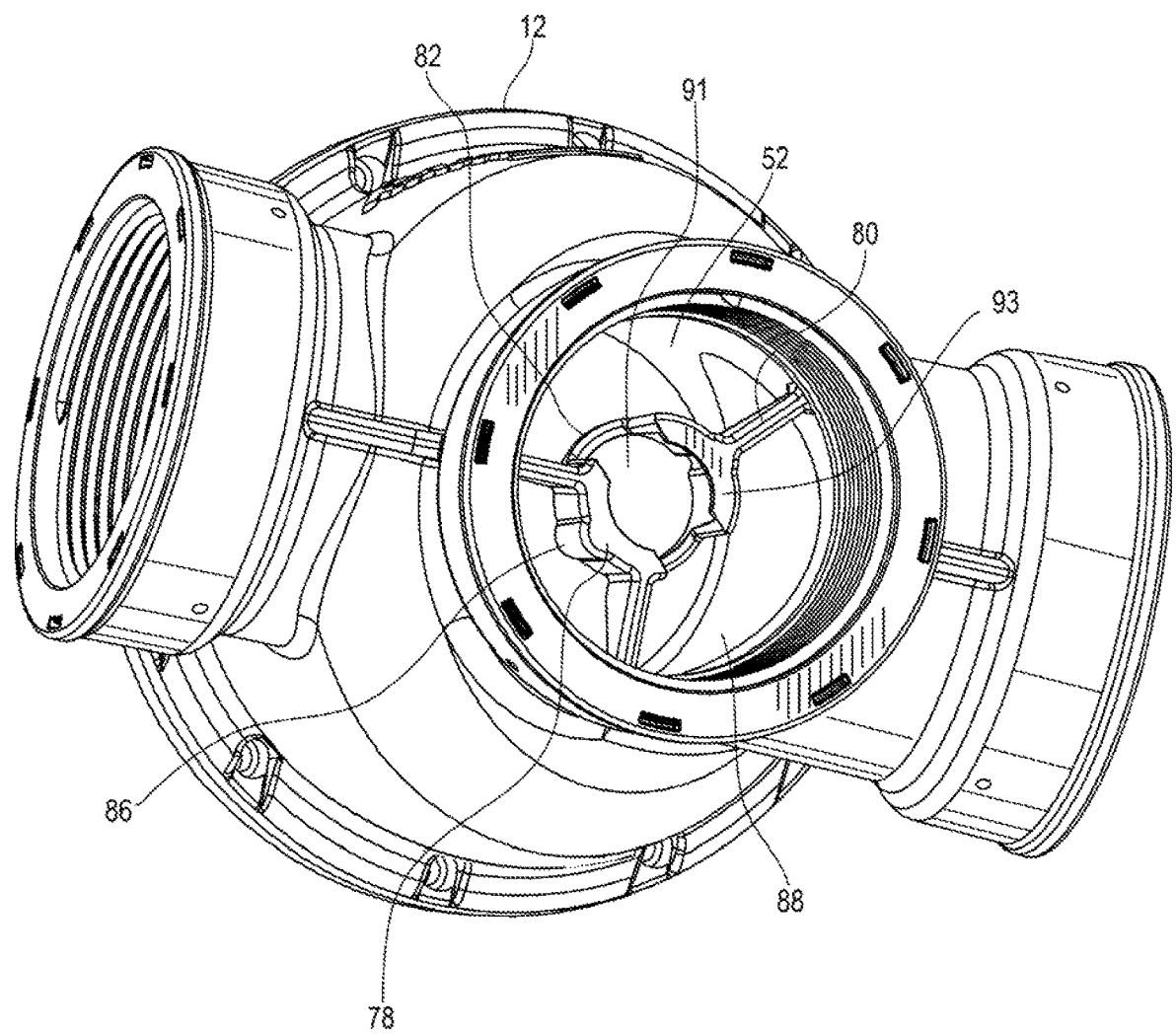
FIG. 9 is a bottom perspective view of the valve body of FIG. 2.

Referring to FIGS. 8 and 9, the valve body 12 includes a scrubber boss 78 to mount the scrubber 50 inside the inner cavity 52 of the valve body 12. The scrubber boss 78 is supported by three support spokes 80 extending from the boss 78 to an inner wall 88 of the inner cavity 52. More specifically, the three support spokes 80 extend radially outward from the boss 78 to the inner wall 88. The scrubber boss 78 includes two diametrically opposed openings 91 that each form ledges 82 at the upper portion of the boss 78. The scrubber 50 also includes protrusions 84 (FIG. 6) that seat in complementary shaped channels 86 axially extending along the inside of the boss 78. This arrangement aligns the scrubber 50 with the boss 78 and prevents the scrubber 50 from rotating. The valve body 12 with the scrubber boss 78 and support spokes 80 can be molded of plastic, such as Nylon 6/6 35% Glass Reinforced which is commercially available from BASF as Ultramid® A3WG7. The valve body 12 may be molded as a single piece.

Figure 7:
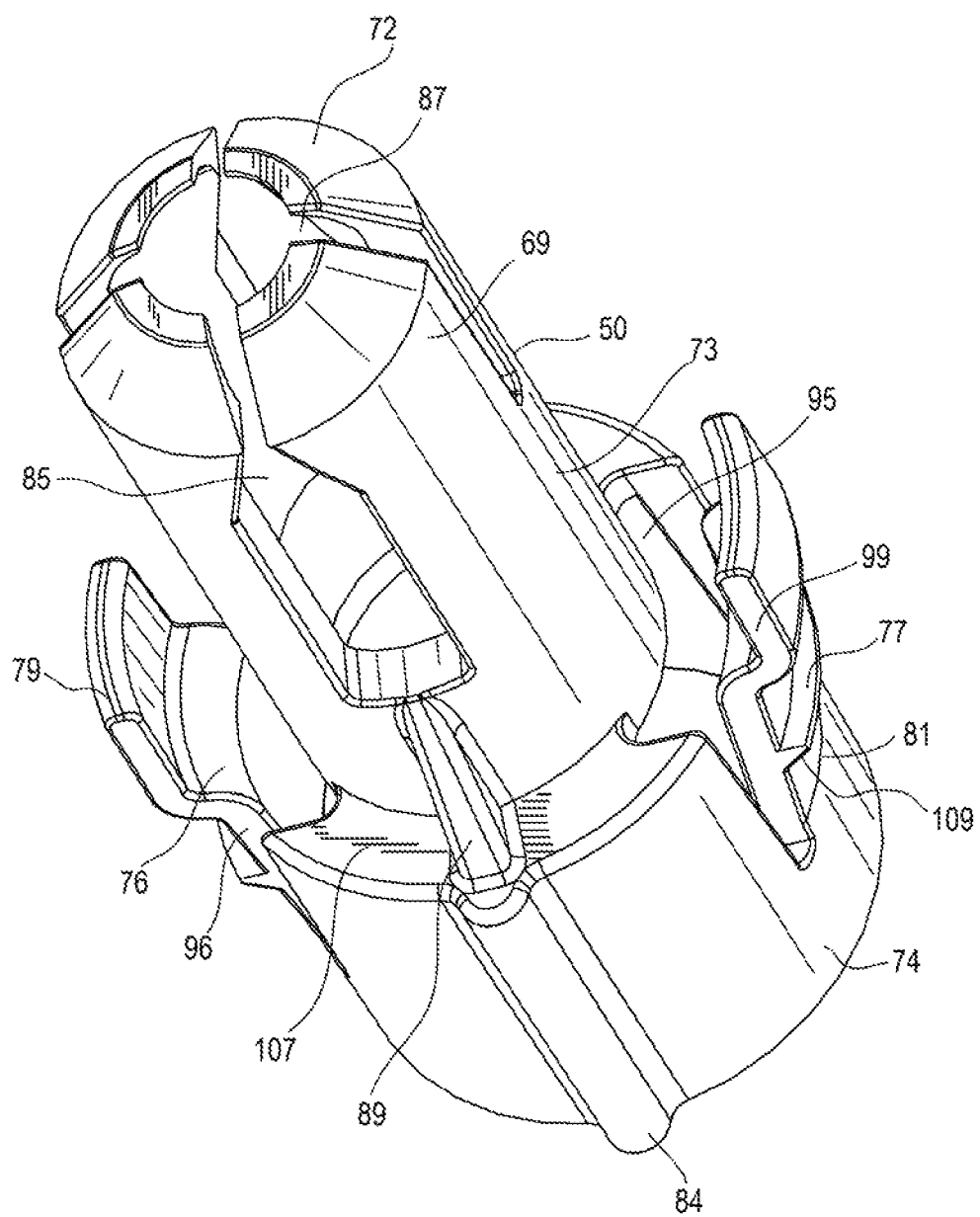
FIG. 7 is a top perspective view of the scrubber of FIG. 6.

Referring to FIG. 7, the wings 76 are naturally biased outward to their fullest extent when the scrubber 50 is not seated in the scrubber boss 78. The wings 76 operate about a living hinge 81. When the scrubber 50 is placed in the scrubber boss 78, the wings 76 deflect inward into an operating gap 95. The operating gap 95 provides room for the wings 76 to be forced inward so that the locking ledges 77 can pass the boss ledges 82. The wings 76 then move radially outward, and the locking ledges 77 clip underneath the boss ledges 82. The locking ledges 77 have an angled surface 109 at the bottom portion of the ledges 77. The angled surface 109 slides against the boss 78 to push the wings 76 inward as the locking ledges 77 pass the boss ledges 82.

Figure 10:
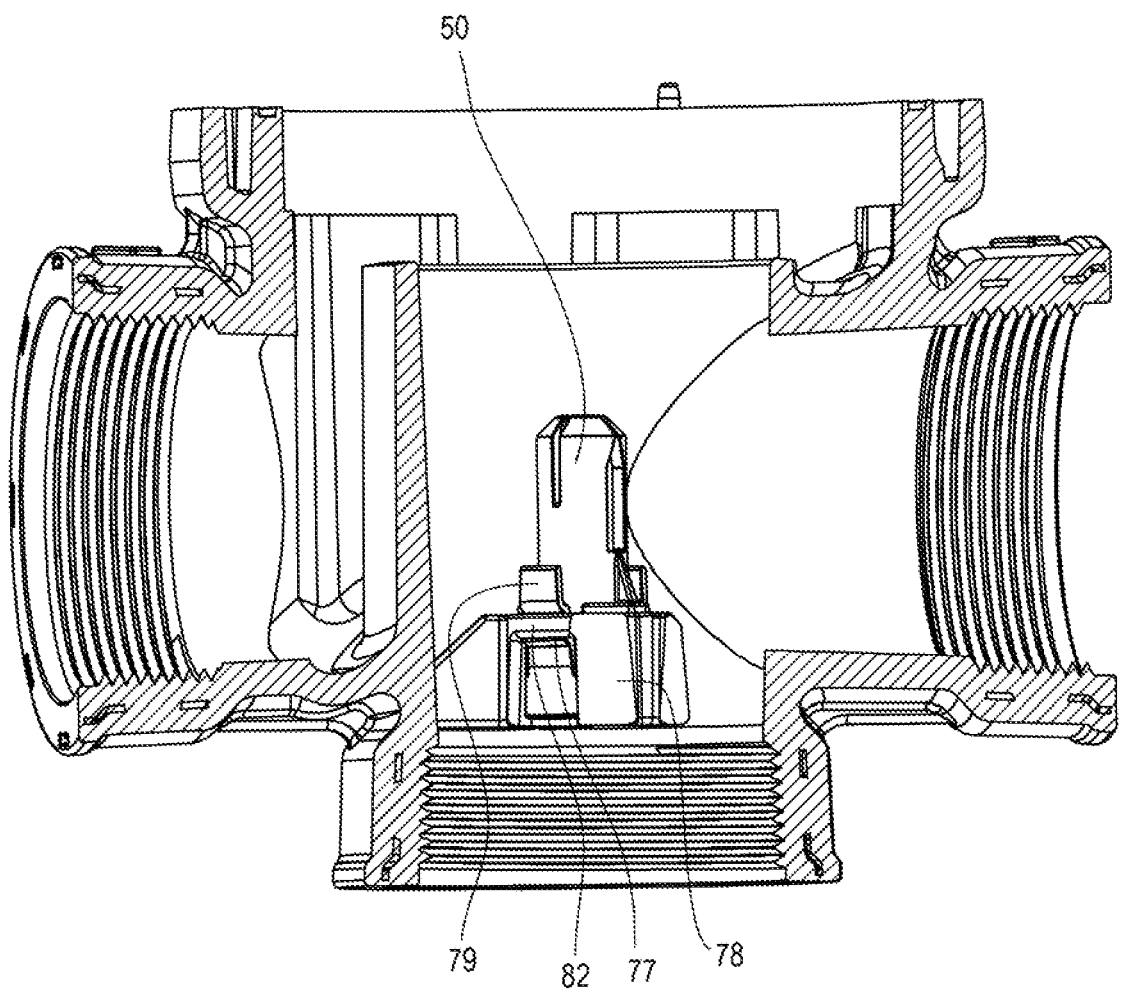
FIG. 10 is a top perspective, partial cross-sectional view of the valve body of FIG. 2 and the scrubber of FIG. 6.

With reference to FIG. 9, the underside of the scrubber boss 78 and the openings 91 are shown along with a scrubber boss seat 93. As the scrubber 50 is manually inserted downward into the boss 78, the protrusions 84 slide into the complementary shaped channels 86, and then, the wings 76 are deflected inward by the boss 78 so that the scrubber 50 slides inside the boss 78. This is done with the aid of the angled surfaces 109 of the locking ledges 77. Upon final insertion, the scrubber 50 sits on the boss seat 93, and the locking ledges 77 are clipped into place underneath the boss ledges 82, as discussed above. FIG. 10 shows the scrubber 50 affixed in the scrubber boss 78.

To manually remove the scrubber 50, one easily locates the handles 79 of the wings 76 and pinches the handles 79 sufficiently inwards into the operating gaps 95, such that the locking ledges 77 release from the boss ledges 82, and then pulls the scrubber 50 longitudinally from the boss 78. The handles 79 are positioned and sized to be readily accessible and designed to provide enhanced leverage for easy removal of the scrubber. More specifically, the wings 76 include a latching (or lower) portion 96 which includes the locking ledge 77 and the handle (or upper portion) 79. The handle 79 is stepped radially outward from the latching portion 96 by a radially extending portion 99 transitioning the latching portion 96 to the handle 79. The handle 79 is arcuately elongated and longitudinally elongated to provide sufficient surface for a user's finger to operate it. The longitudinal length increases the leverage to make it easier for the user to squeeze the wings 76 together to release the scrubber 50 from the valve body 12.

The handle/tab 79 of the wings 76 could have an approximate width of 0.215 inches and an approximate height of 0.380 inches. The approximate length of the wing 76 is one inch. The scrubber 50 may be molded from plastic, such as 15% Glass Filled Nylon, which is commercially available from BASF as product A3EGE.

Figure 11:
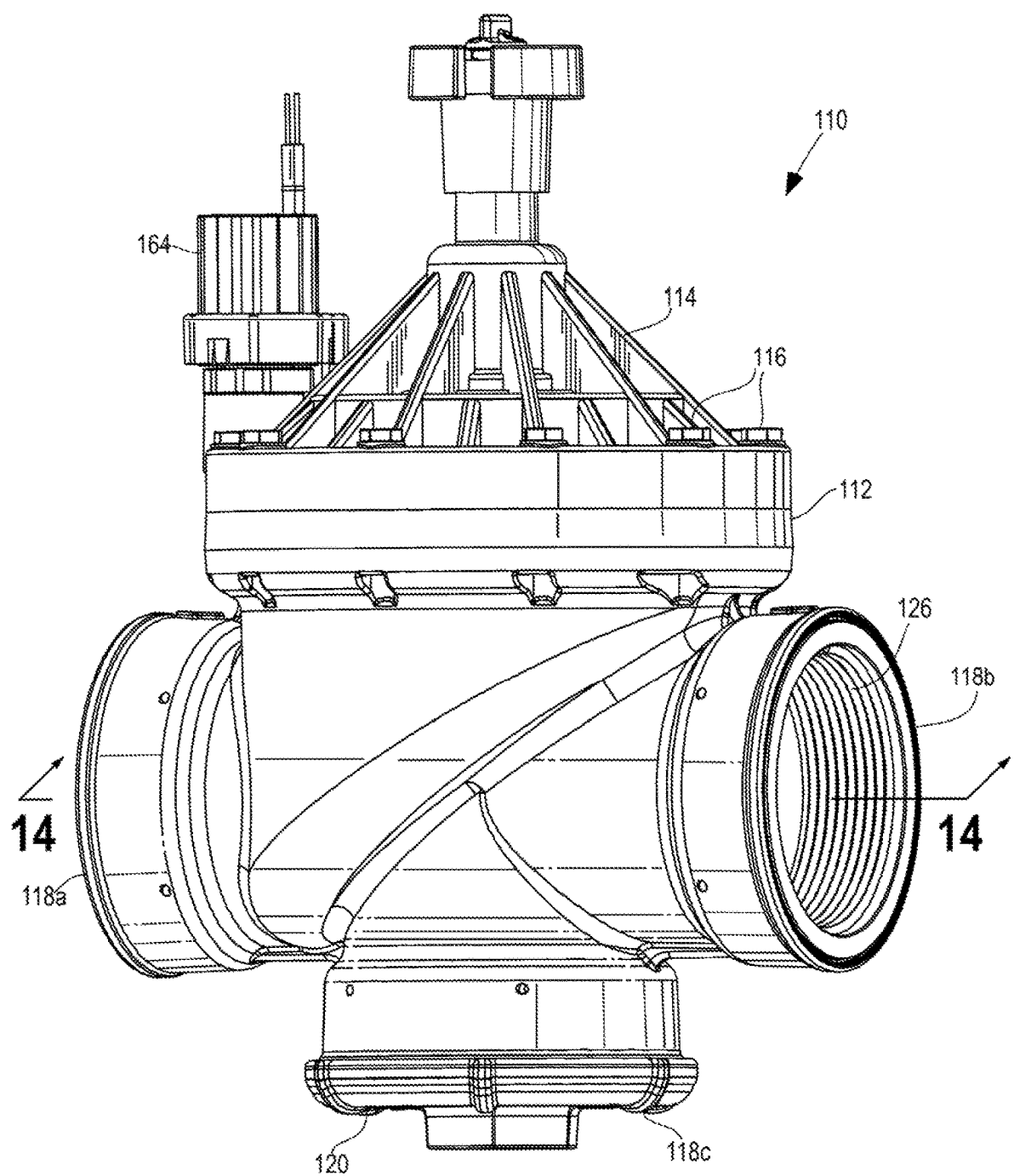
FIG. 11 is a side perspective view of another irrigation valve.

FIGS. 11-23 illustrate an alternative approach to reinforcing the inlet and outlet ports of the valve body and providing a screen scrubber. More specifically, with reference to FIG. 11, there is illustrated a valve 110 with a valve body 112 and a bonnet 114. The bonnet 114 is attached to the valve body 112 with screws 116. The valve body 112 includes an outlet 118a, an inlet 118b opposite the outlet 118a, and an inlet 118c at the bottom of the valve body 114. Each of the inlets and outlet 118a,b,c include internal threads 126. In a typical irrigation system, a pipe is connected to the outlet 118a and one of the two threaded inlets 118b,c. The unused inlet is closed with a plug 120 having a threading 121 (FIG. 13). For example, the flow path that is located upstream has the irrigation piping threaded into the inlet 118b for water to flow into the valve 110. The flow path threaded into the outlet 118a for water to flow out of the valve 110 and into the piping. The plug 120 is threaded into the other inlet 118c.

As noted for the embodiment above, the valve 110 is commonly attached to a main irrigation supply line as well as some piping that supplies different irrigation zones. Again, the valves often handle water flow rates as high as 300 gallons/minute. Therefore, it is desired that pipes be sufficiently secured to the valve 110 as to avoid leakage particularly at the outlet and inlets 18a,b,c. Thus, it is desired to reinforce the outlet and inlets 18a,b,c to prevent fracturing of the valve body 112 and/or piping caused by overtightening which could lead to leakage from cracking of the valve body 112 as well as the attached piping.

Figure 12:
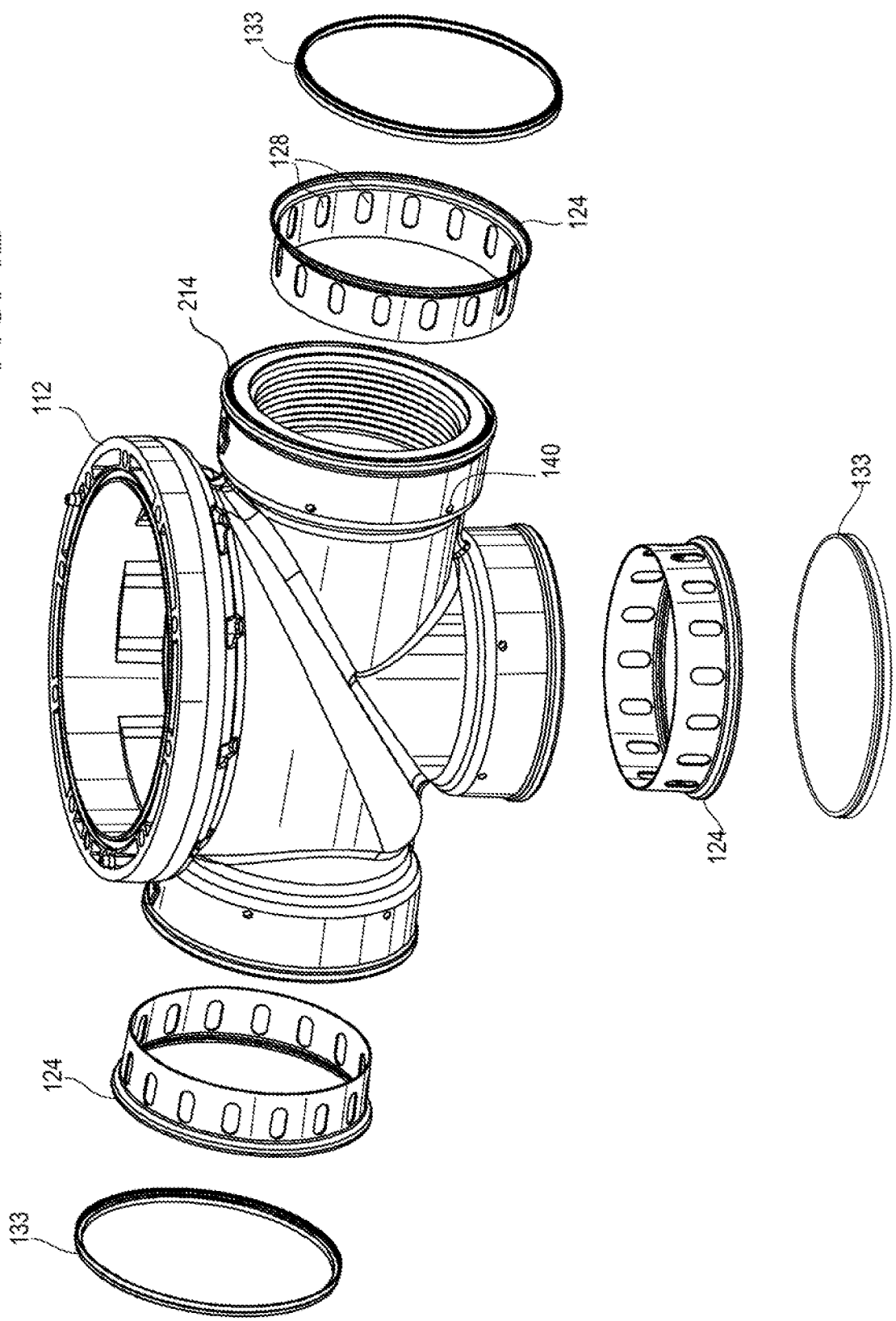
FIG. 12 is an exploded side perspective view of a valve body of the irrigation valve of FIG. 11 showing embedded reinforcement rings and insert rings.
Figure 13:
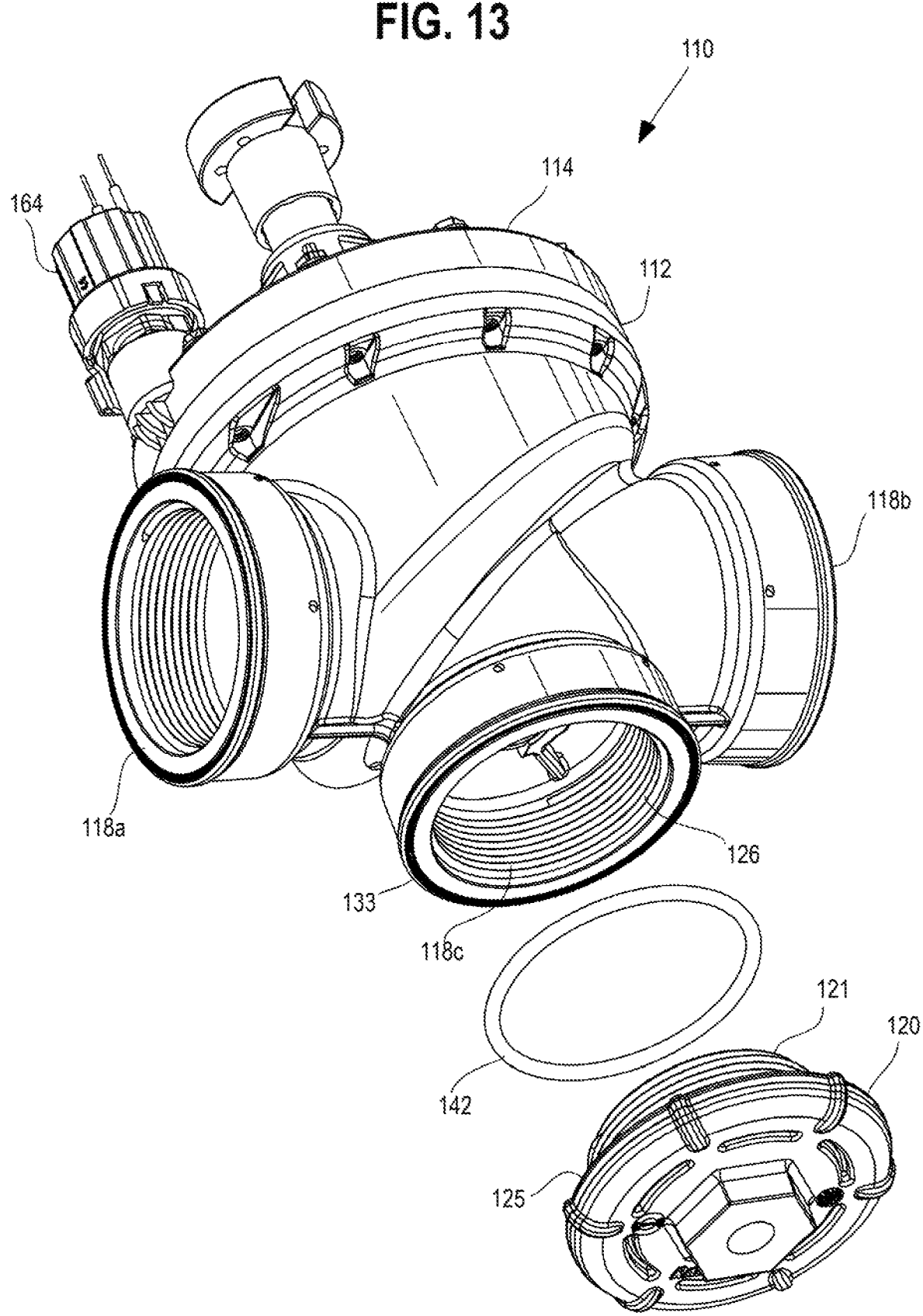
FIG. 13 is an exploded bottom perspective view of the irrigation valve of FIG. 11 showing a plug and an o-ring associated with the valve body.

Referring to FIG. 12, an exploded view of the valve body 112 with reinforcement rings 124 is shown. The reinforcement rings 124 can be made of steel but also can be made of other materials, such as plastic, that add strength to the outlet and inlets 118a,b,c. Preferred materials are 17 gage 302/304 stainless or galvanized steel. The reinforcement rings 124 are embedded into the walls of the outlet and inlets 118a,b,c. Holes 128 in the rings 124 allow plastic to fill in the area defined by the holes 128 to further help to lock the rings 124 into place. During the molding process, plastic flows into and through the holes 128. The holes 128 are shown oblong but could be any shape, including circular, triangular, and rectangular shape.

A molding tool insert ring 133 is attached to each of the reinforcement rings 124, as described further below. During molding operations, a molding tool holds the insert rings 133 in the outlet and inlets 118a,b,c to maintain the reinforcement rings 124 in place as plastic is being injected into the mold and the valve body 112 is being formed.

Figure 20:
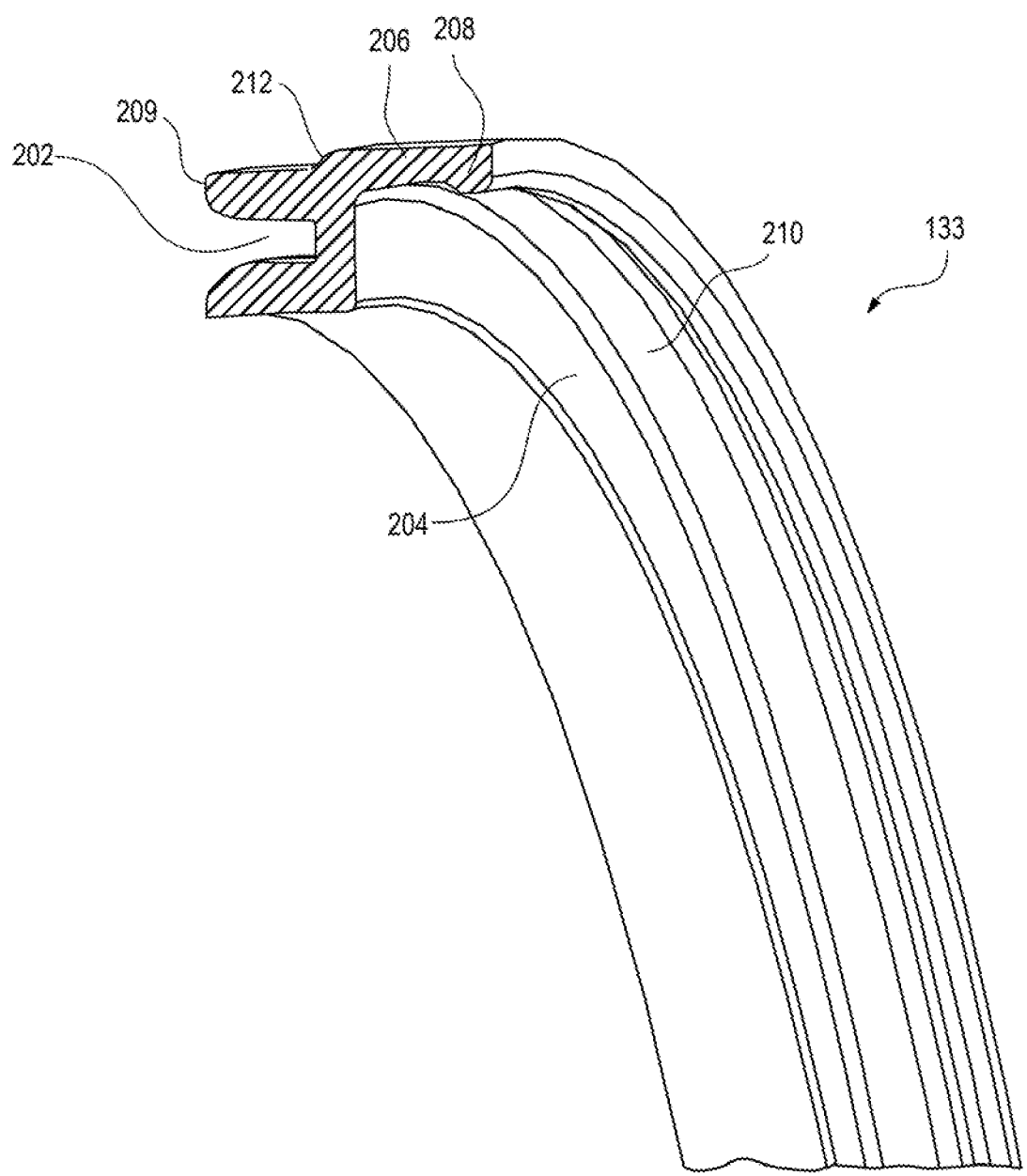
FIG. 20 is a cross-sectional view of a portion of one of the insert rings of FIG. 12.
Figure 21:
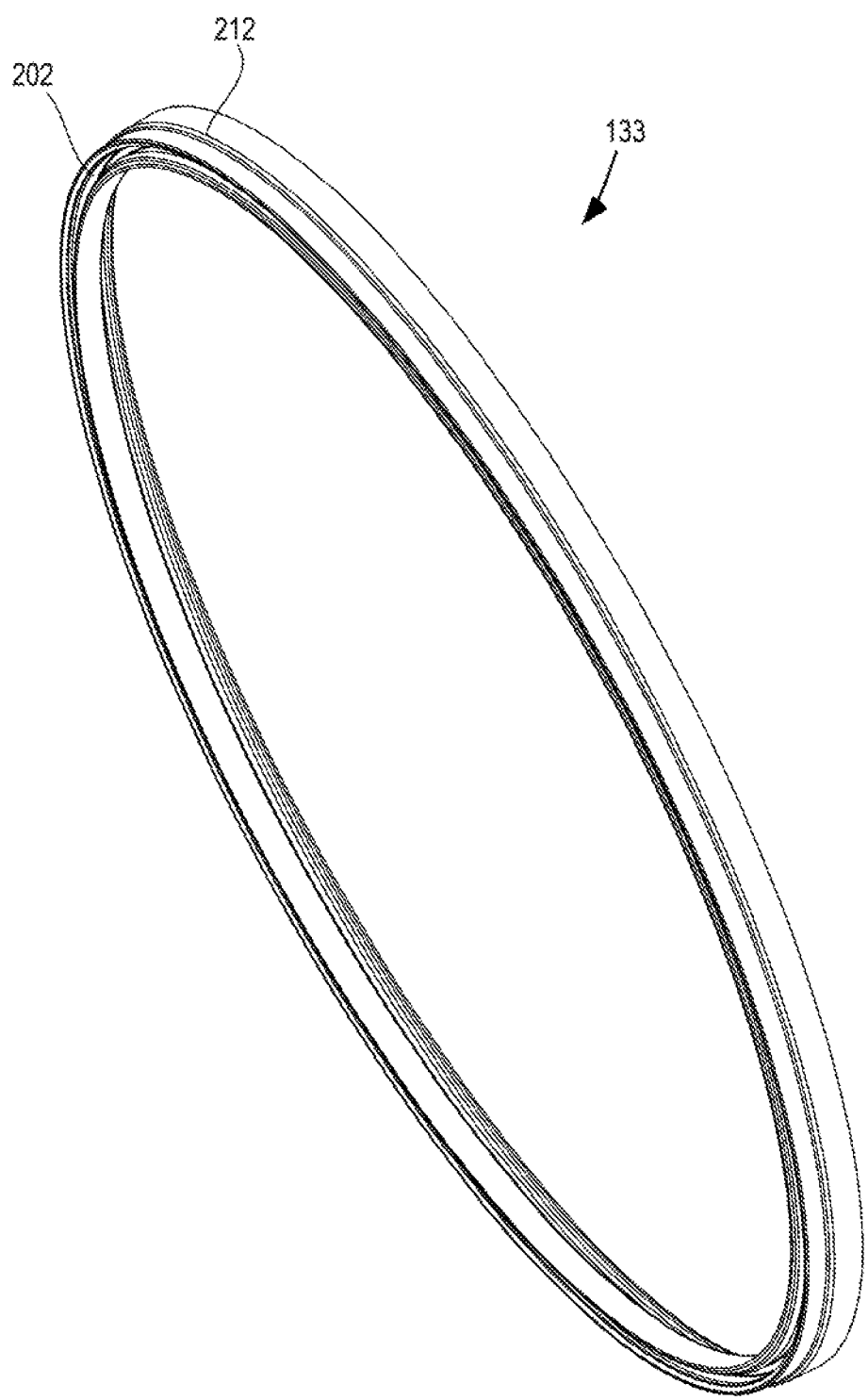
FIG. 21 is a bottom perspective view of one of the insert rings of FIG. 12.
Figure 22:
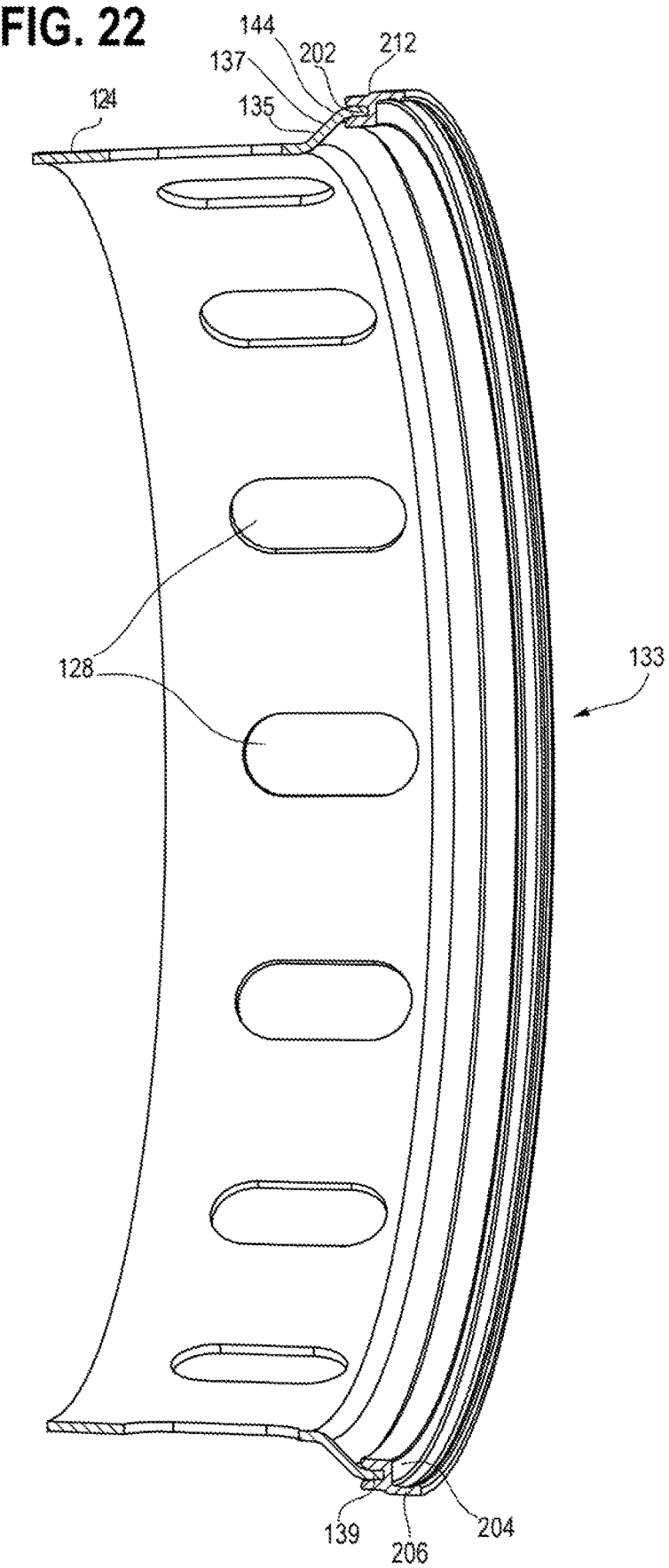
FIG. 22 is a partial cross-sectional view of one of the insert rings and one of the reinforcement rings of FIG. 12.
Figure 23:
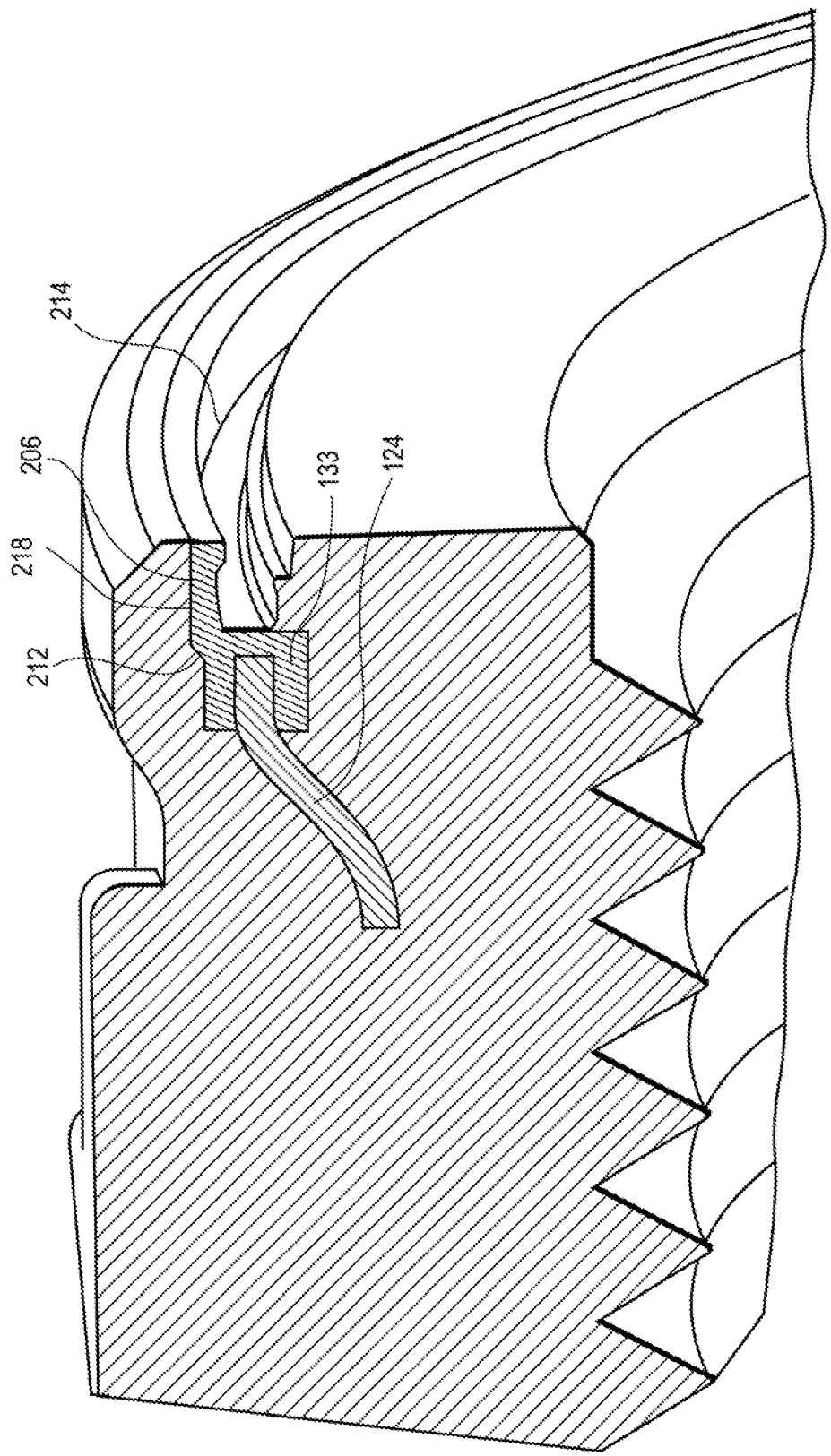
FIG. 23 is a cross-sectional view of one of the insert rings and the reinforcement ring of FIG. 22 embedded in the valve body of FIG. 12.

More specifically, and with reference to FIGS. 20 and 21, each insert ring 133 has a groove 202, a seat 204 and a skirt 206. The molding tool connects to the insert ring 133 using an annular pocket 210 formed between an annular rib 208 of the skirt 206 and the seat 204. The end of the molding tool is configured to cooperate with the pocket 210 of the insert ring 133. The reinforcement ring is the same as the ring 124 shown in FIG. 12. With reference to FIG. 22, the reinforcement rings 124 have a radially outward lip 144 that has a first outward bend 135 followed by a second bend 137 that axially aligns the remainder 139 of the lip 144 with the reinforcement ring 124. The remainder 139 of the lip 144 extends into the groove 202 and is held in place by friction or adhesive. The groove 202 includes arcuate or chamfered edges 209 to aid in receiving the remainder 139 of the lip.

The insert ring 133 includes an outer angular stepped profile 212 (FIGS. 20-23). The step 212 is at the transition between the portion forming a continuous groove 214 (FIGS. 12 and 23) and the skirt 206 so that an outer groove surface (forming the pocket 210) of the continuous groove 214 has a smaller diameter than an outer skirt surface 218 of the skirt 206. The stepped profile 212 allows the insert ring 133 to fit around the molding tool, while maintaining generally equal material thickness throughout the insert ring 133. During the molding process, the reinforcement rings 124 are molded into the valve body 112, and the insert rings 133 (being made of the same or similar plastic material as the valve body 112) chemically bond to or with the material of the valve body 112. Thus, the reinforcement rings are secured against movement in the valve body and sealed against exposure to moisture. More specifically, the insert rings 133 help prevent exposure of the metal reinforcement rings 124 to harmful elements, such as rain, condensation and leakage, which can degrade the metal over time. The insert rings 133 may be made of plastic (as opposed to, for instance, metal, such as stainless steel), which can also help to alleviate degradation to the mold that otherwise may occur when there is metal-to-metal contact. The insert rings 133 may also be made of the same material as the valve body 12. The sides of the outlet and inlets 118a,b,c also include small depressions 140 formed by pins extending inward in the mold to provide further stabilization of the reinforcement rings 124 during molding. The insert rings 133 enable formation of the continuous grooves 214. The continuous grooves 214 aid in allowing the molding cores that produce the threads 126 to unwind during the molding operation.

Referring to FIG. 13, the inlet 118c may be sealed with the plug 120. The plug 120 may be made of rubber, plastic, or any other material conducive to forming a seal to prevent water leakage. A preferred material is Nylon 6/6 35% Glass Reinforced which is commercially available from BASF as Ultramid® A3WG7. The plug 120 has threads 121 for connecting the plug 120 to the threads 126 of the inlet 118c or 118b. An annular face 134 of the outlet and inlets 118a,b,c provides an engagement surface for an o-ring 142 that sits between the annular face 134 and the plug 120. The diameter of the o-ring 142 is smaller than the inner diameter of the continuous groove 214 so that it does not extend over the continuous groove 214 when compressed for sealing. The o-ring 142 may be in the shape of a torus, and is preferably made of elastomeric material, such as rubber or plastic. The o-ring 142 seals the plug 120 to the inlet 118c to prevent leakage. Alternatively, the o-ring 142 may be seated on the face 134 of the side inlet 118b, and the plug 120 is threaded into the side inlet 118b. In this configuration, a pipe may be threaded into the bottom inlet 118c, forming a vertical inlet for water to flow into the valve body 112. In either case, the plug 120 includes an annular flange 125 that engages the o-ring 142 and compresses it against the face 134.

Also for this alternative embodiment, it would be possible to use a metal ring that did not have a radially outward lip. For instance, a metal ring may have a uniform diameter extending straight through the valve body 112 from the continuous groove 214 of the face 134, and the tooling used to set the reinforcement rings 124 would remain the same. This would provide reinforcement; however, this would place the continuous groove 214 in a position that would result in unequal amounts of plastic at different locations on the inside and the outside of the reinforcement rings 124, thus potentially leading to increased stress on the reinforcement rings 124. Also, having the insert ring 133 located more centrally on the seating face 134 could interfere with the sealing of the plug 120 and the o-ring 142 against the seating face 134. While this version would still increase the strength of the inlets and outlet, the version above is preferred because the widening diameter of the outlet and inlets 118a,b,c permits having a similar amount of material on both the inner and outer surfaces of the reinforcement rings 124.

Figure 14:
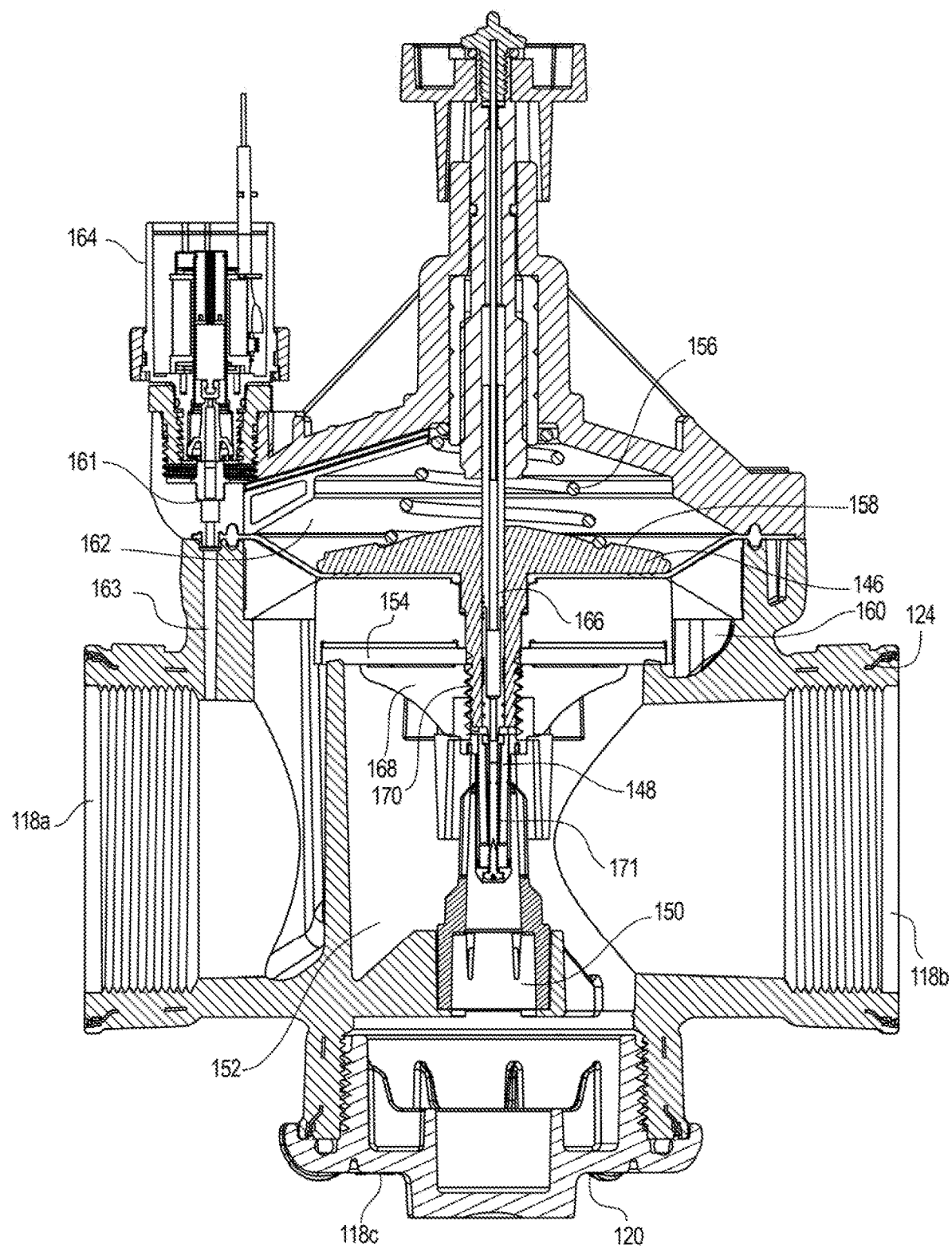
FIG. 14 is a cross-sectional view of the irrigation valve of FIG. 11 taken along line 14-14 of FIG. 11.

With reference to FIG. 14, the valve 110 includes a diaphragm assembly 146, a filter 148, and a scrubber 150. The embedded reinforcement rings 124 are also seen overmolded with plastic around the threaded inlets 118b,c and outlet 118a, and the inlet 118c is sealed with the plug 120. As water flows through the inlet 118b, the water enters a main cavity 152. The pressure of the inflowing water pushes the diaphragm assembly 146 off a valve seat 154 if the pressure is sufficient to counteract the downward pressure from a spring 156 and any remaining pressure in a pressure chamber 162 pushing down on a top side 158 of the diaphragm assembly 146. A solenoid 164 can open a pilot valve 161 to release the water in the pressure chamber 162 allowing water to exit through a passage 163 to the outlet 118a and downward pressure on the diaphragm assembly to be decreased.

Furthermore, water in the main cavity 152 will also proceed through the filter 148 and into a passageway 166. This water enters the pressure chamber 162 to help close the valve 110 and maintain the valve 110 closed when the solenoid 164 and the pilot valve 161 prevent flow from the pressure chamber 162 through the passage 163 to the outlet 118a. The filter 148 has a top portion 168 that threads on to a threaded stem portion 170 of the diaphragm assembly 146. The filter 148 blocks debris attempting to enter the passageway 166 that could otherwise cause blockage throughout the passageway 166. Such blockage could prevent the desired amount of water entering the pressure chamber 162 and affect the control of the valve 110. The filter 148 includes holes 171 (or slots) that allow water to pass through, yet the holes 171 are of predetermined size and number to block debris from entering the passageway 166 while also allowing the appropriate amount of water flow.

Debris can encounter the filter 148 just from water containing debris flowing through the valve 110 and/or from being drawn into the filter 148 as it flows into the pressure chamber 162. Any debris that builds on the filter 148 can become trapped in the filter holes 171 and can impede performance of the valve 110, including the desired flow to the pressure chamber 162. The scrubber 150 scrubs the filter 148 as the diaphragm assembly 146 moves to break free debris that may be on the filter or clogging the filter holes 171.

Figure 15:
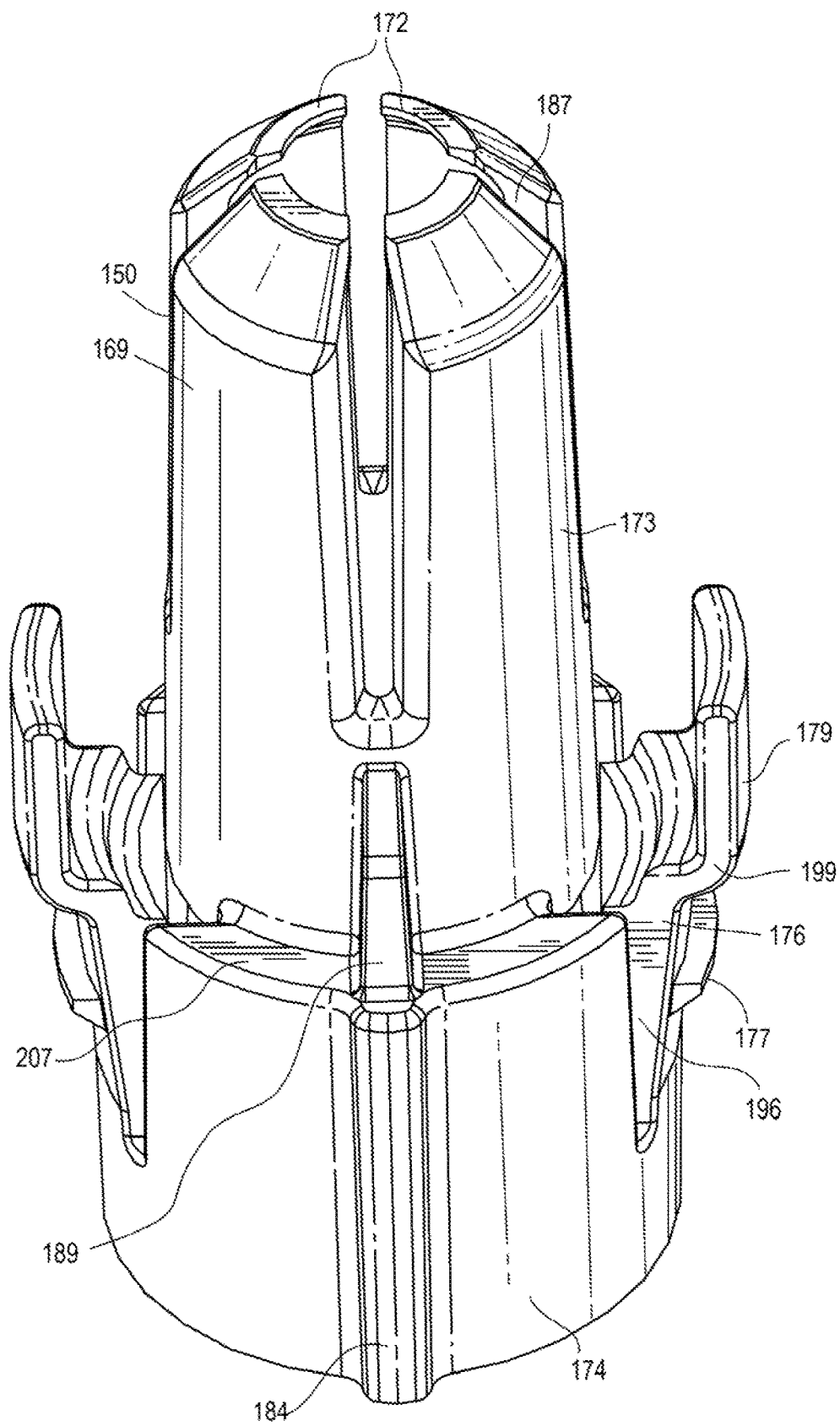
FIG. 15 is a side perspective view of a scrubber of the irrigation valve of FIG. 11.

As seen in FIG. 15, the scrubber 150 has an upper portion 173 with scrubber fingers 169 having arcuate edges 172 at the top of the fingers 169. The arcuate edges 172 match the arcuate outer profile of the filter 148 to scrape against the filter 148 as the filter 148 moves vertically up and down with the diaphragm 146 during operation of the valve 110. The fingers 169 of the upper portion 173 are supported by stanchions 189. The stanchions 189 extend from a ledge 207 of a base portion 174 to the upper portion 173. The fingers 169 are separated by longitudinal finger grooves 187 that enable the fingers 169 to flex in and out radially. The finger grooves 187 also allow water to pass into the filter 148 and then into the passageway 166. The base portion 174 of the scrubber 150 has wings 176, each wing 176 being moveable radially. The wings 176 each have a locking ledge 177 for attachment to the valve body 112 and a handle or tab 179 that enables one to manually move the wings 176 radially inward against an outward bias of the wings 176 to disengage the locking ledge 177 from the valve body 112 to remove the scrubber 150. The handles/tabs 179 extend away from the scrubber 150 to provide enhanced leverage in unlatching the locking ledge 177 for manual removal of the scrubber 150. The handles/tabs 179 are enlarged for easy location and manipulation by a user reaching into the valve body 112.

Figure 17:
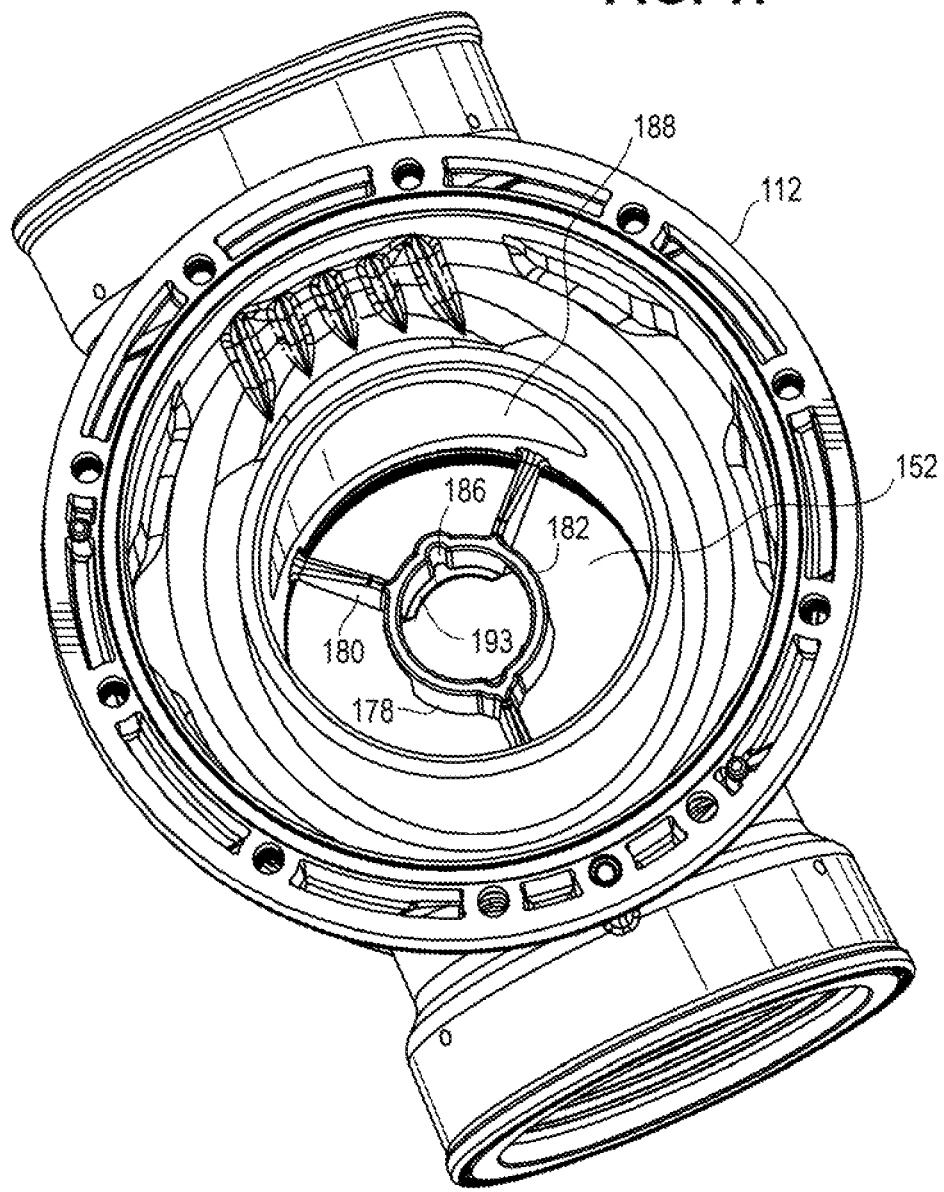
FIG. 17 is a top perspective view of the valve body of FIG. 12.
Figure 18:
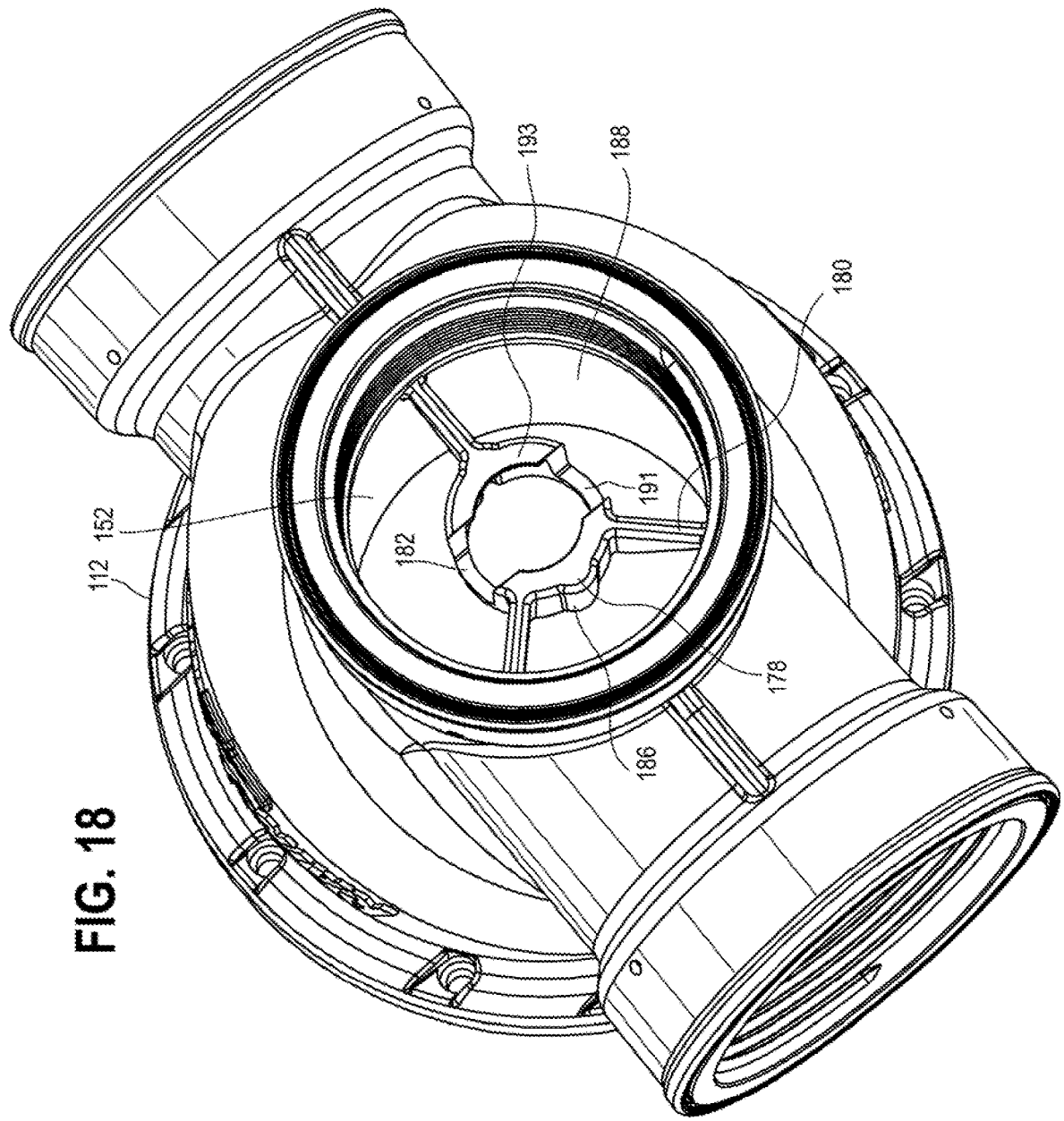
FIG. 18 is a bottom perspective view of the valve body of FIG. 12.

Referring to FIGS. 17 and 18, the valve body 112 includes a scrubber boss 178 to mount the scrubber 150 inside the inner cavity 152 of the valve body 112. The scrubber boss 178 is supported by three support spokes 180 extending from the boss 178 to an inner wall 188 of the inner cavity 152. More specifically, the three support spokes 180 extend radially outward from the boss 178 to the inner wall 188. The scrubber boss 178 includes two diametrically opposed openings 191 that each form ledges 182 at the upper portion of the boss 178. The scrubber 150 also includes protrusions 184 (FIG. 15) that seat in complementary shaped channels 186 axially extending along the inside of the boss 178. This arrangement aligns the scrubber 150 with the boss 178 and prevents the scrubber 150 from rotating. The valve body 112 with the scrubber boss 178 and support spokes 180 can be molded of plastic, such as Nylon 6/6 35% Glass Reinforced which is commercially available from BASF as Ultramid® A3WG7. The valve body 112 may be molded as a single piece.

Figure 16:
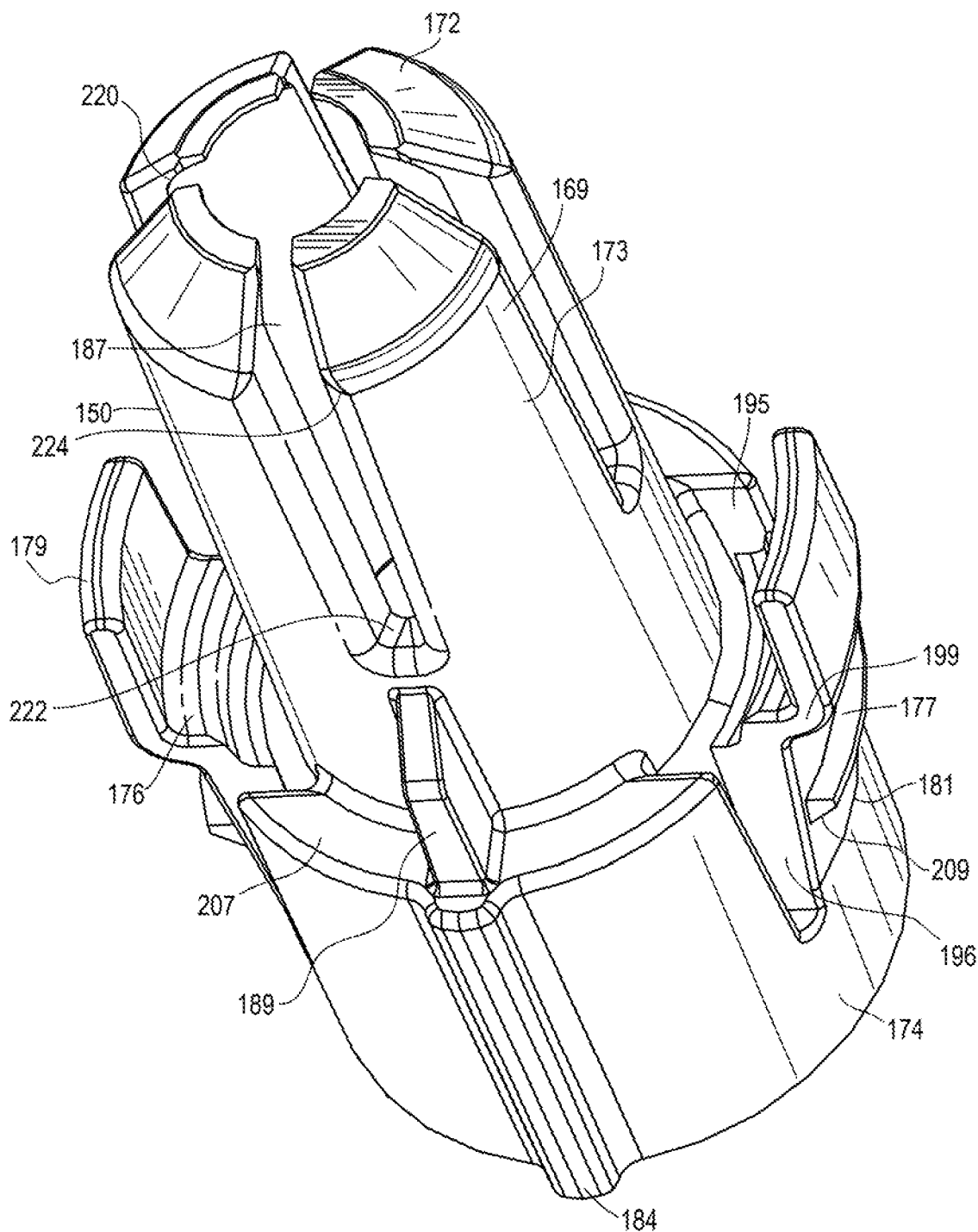
FIG. 16 is a top perspective view of the scrubber of FIG. 15.

Referring to FIG. 16, the wings 176 are naturally biased outward to their fullest extent when the scrubber 150 is not seated in the scrubber boss 178. The wings 176 pivot at a living hinge 181. When the scrubber 150 is placed in the scrubber boss 178, the wings 176 deflect inward into an operating gap 195. The operating gap 195 provides room for the wings 176 to push inward so that the locking ledges 177 can pass the boss ledges 182. The wings 176 then move radially outward, and the locking ledges 177 clip underneath the boss ledges 182. The locking ledges 177 have an angled surface 209 at the bottom portion of the ledges 177. The angled surface 209 slides against the boss 178 to push the wings 176 inward as the locking ledges 177 pass the boss ledges 182.

Figure 19:
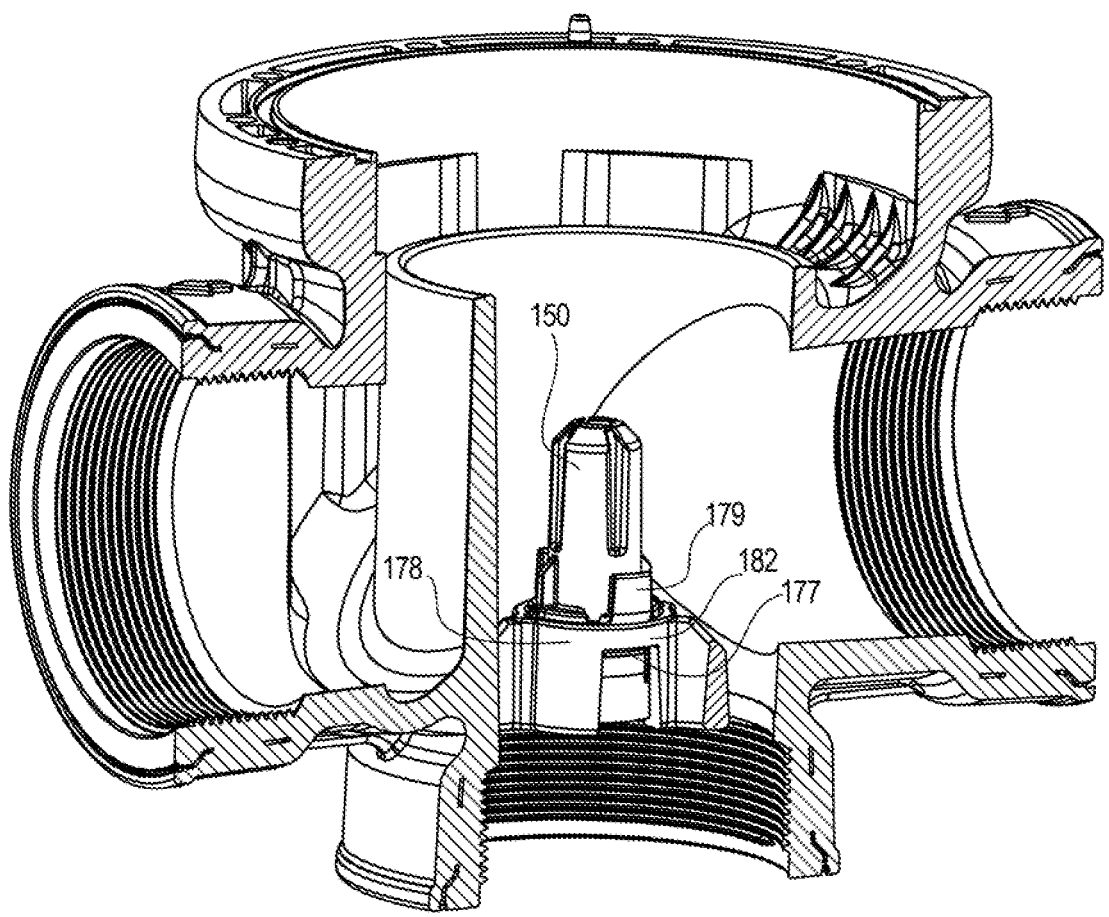
FIG. 19 is a top perspective, partial cross-sectional view of the valve body of FIG. 12 and the scrubber of FIG. 15.

With reference to FIG. 18, the underside of the scrubber boss 178 and the openings 191 are shown along with a scrubber boss seat 193. As the scrubber 150 is manually inserted downward into the boss 178, the protrusions 184 slide into the complementary shaped channels 186, and then, the wings 176 are deflected inward by the boss 178 so that the scrubber 150 slides inside the boss 178. This is done with the aid of the angled surfaces 209 of the locking ledges 177. Upon final insertion, the scrubber 150 sits on the boss seat 193, and the locking ledges 177 are clipped into place underneath the boss ledges 182, as discussed above. FIG. 19 shows the scrubber 150 affixed in the scrubber boss 178.

To manually remove the scrubber 150, one pinches the handles 179 sufficiently inwards into the operating gaps 195, such that the locking ledges 177 release from the boss ledges 182, and then pulls the scrubber 150 longitudinally from the boss 178. The handles 179 are positioned to be readily located and accessible and designed to provide enhanced leverage for easy removal of the scrubber. More specifically, the wings 176 include a latching (or lower) portion 196 which includes the locking ledge 177 and the handle (or upper portion) 179. The handle 179 is stepped radially outward from the latching portion 196 by a radially extending portion 199 transitioning the latching portion 196 to the handle 179. The handle 179 is arcuately elongated and longitudinally elongated to provide sufficient surface for a user's finger to operate it. The longitudinal length increases the leverage to make it easier for the user to squeeze the wings 176 together to release the scrubber 150 from the valve body 112.

The handle/tab 179 of the wings 176 could have an approximate width of 0.215 inches and an approximate height of 0.380 inches. The approximate length of the wing 176 is one inch. The scrubber 50 may be molded from plastic, such as 15% Glass Filled Nylon, which is commercially available from BASF as product A3EGE.

Figure 24:
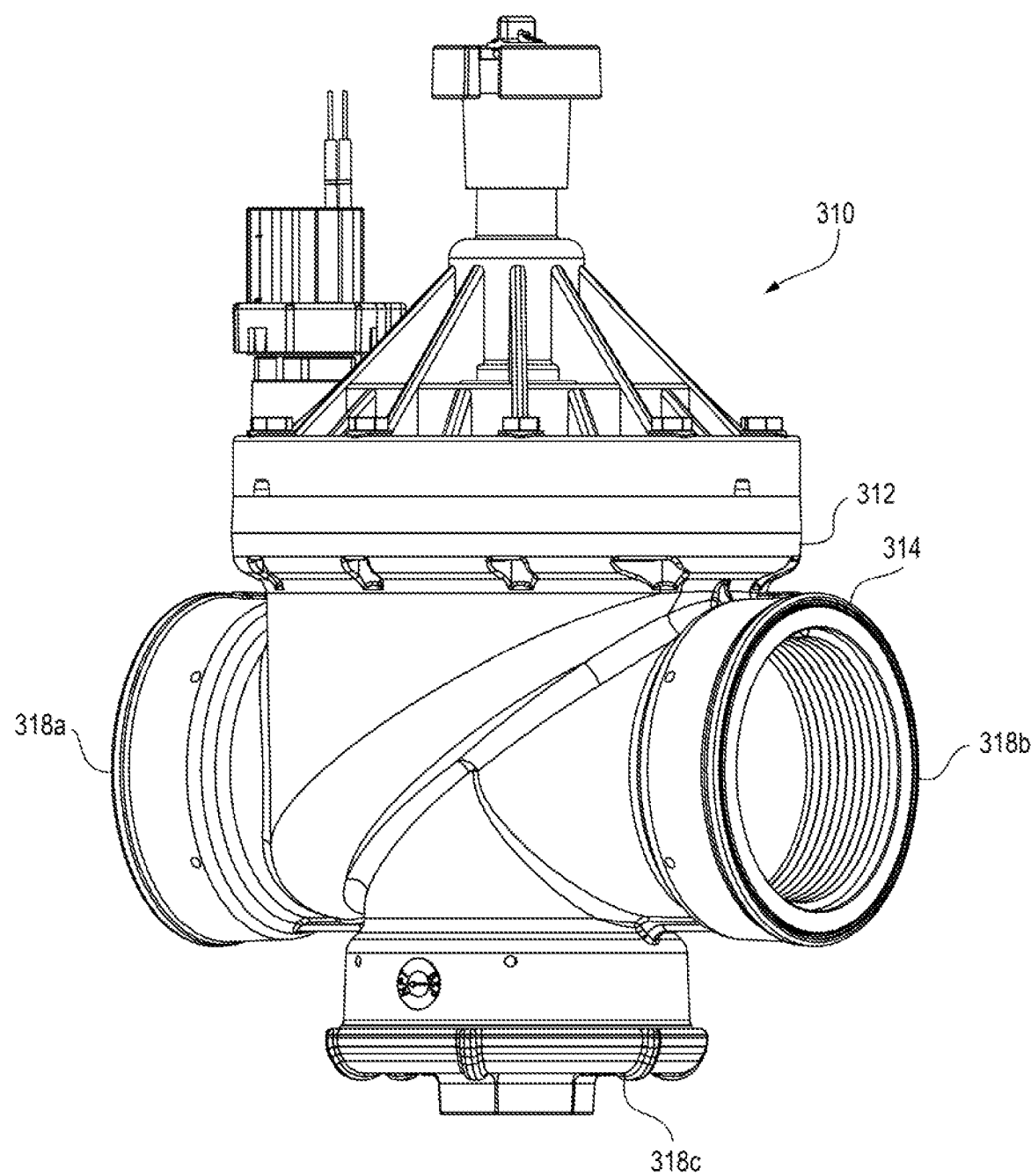
FIG. 24 is a side perspective view of another irrigation valve.
Figure 25:
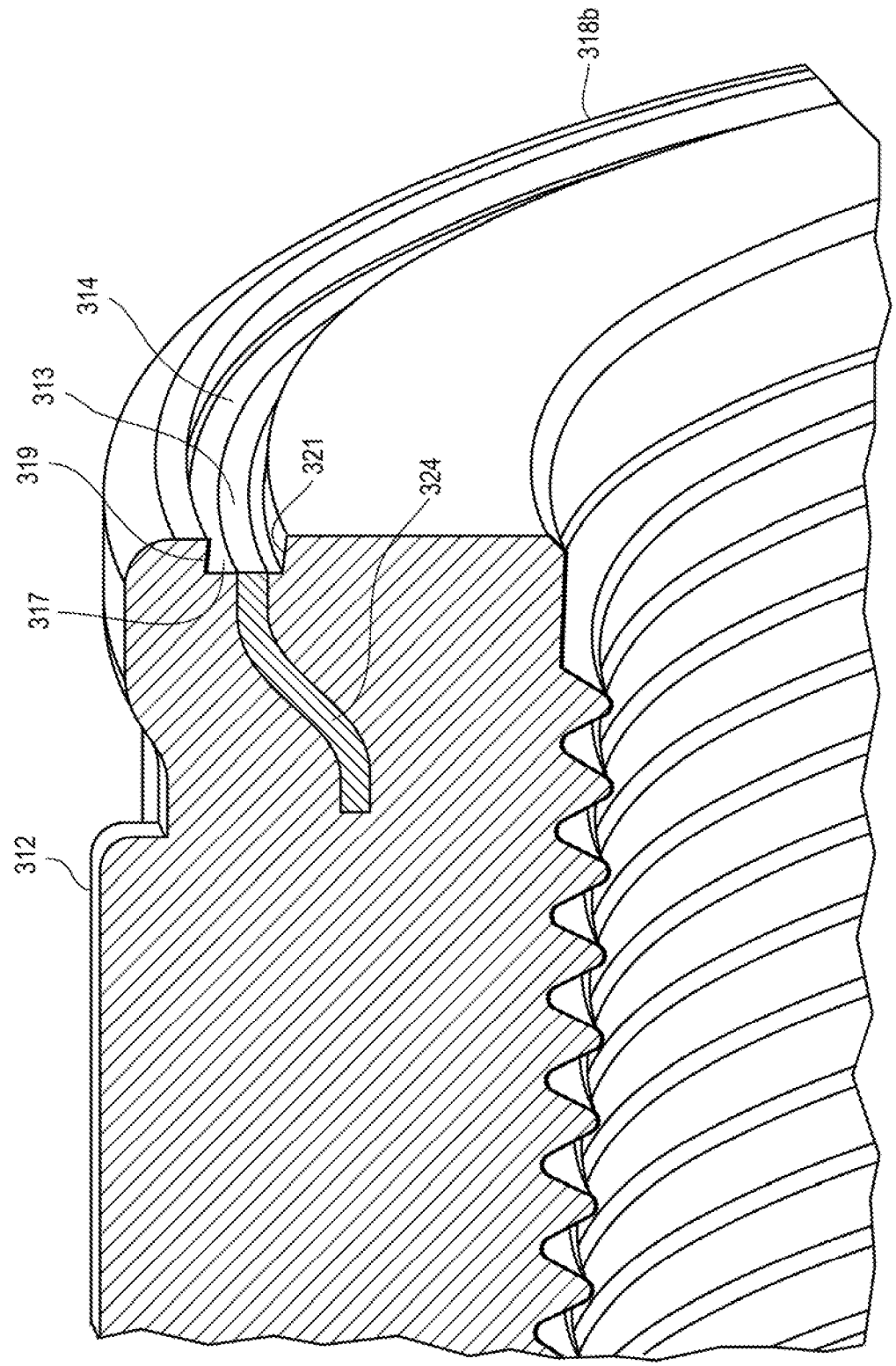
FIG. 25 is a cross-sectional view of a reinforcement ring embedded in the valve body of FIG. 24.

FIGS. 24-25 illustrate an alternative approach to reinforcing inlet and outlet ports of a valve body as explained below. While described for only inlet port 318b, the following also applies for the other ports (318a,c) of a valve body 312. A continuous groove 314 surrounds the entrance of the inlet 318b. The continuous groove 314 is formed by a mold core holding a reinforcement ring 324 during the molding process. More specifically, the reinforcement ring 324 is magnetically secured in place within the valve body 312. The reinforcement rings 324 may be the same as those in the previous embodiments, but now are preferably formulated to have enhanced magnetic properties. For example, the above reinforcement rings may be coated in zinc. A molding tool with magnetic metal rods in its core magnetically support and stabilize the reinforcement rings 324 the valve body 312 is being molded. The metal-to-metal contact between an annular, end face 313 of the reinforcement ring 324 and the metal rods of the tool is magnetized, resulting in enhanced stabilization during the molding process. After the mold is poured, the tool is removed, and the continuous 314 groove remains. The continuous groove 314 has an outer annular surface 319 and inner annular surface 321 on the valve body 312 and a base 317 extending between the two surfaces. The base 317 is formed from the combination of the annular end face 313 and the valve body 312. As with the above alternative, the continuous groove 314 aides in removing the molding core for the threads.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the technological contribution. The actual scope of the protection sought is intended to be defined in the following claims.

What is claimed is:
1. An irrigation valve comprising:
a body defining an inlet and outlet, and a valve seat between the inlet and the outlet;
a diaphragm mounted at the body to engage the valve seat to prevent flow from the inlet to the outlet and to move away from the valve seat to allow flow between the inlet and the outlet;

a pressure chamber formed by the body and the diaphragm, the chamber controlling movement of the diaphragm depending on the pressure in the pressure chamber;

a solenoid controlling the pressure in the pressure chamber;

a flow path for fluid from the inlet to pass into the pressure chamber;

a filter attached to the diaphragm to filter debris from fluid flowing into the flow path, the filter moving with the diaphragm;

a scrubber fixed to the body, the scrubber having at least one scrubber arm that engages the filter to remove debris from the filter as the filter moves with the diaphragm; and the scrubber having at least one outward biased latch arm separate from the at least one scrubber arm, the latch arm having a latch and being manually movable by a user from a first position where the latch is interlocked with the body to a second position where the latch is free of the body, and the latch arm being spaced from the filter such that the latch arm cannot engage the filter to remove debris from the filter as the filter moves with the diaphragm.

2. The irrigation valve of claim 1 wherein the body comprises a support to mount the scrubber.

3. The irrigation valve of claim 2 wherein the support defines a socket to receive at least a portion of the scrubber.

4. The irrigation valve of claim 3 wherein the socket includes a ledge and the latch directly engages the ledge when in the first position.

5. The irrigation valve of claim 4 wherein the at least one outward biased latch arm of the scrubber naturally biases toward the ledge.

6. The irrigation valve of claim 5 wherein the at least one outward biased latch arm of the scrubber includes a tab to be engaged manually to unlatch the latch from the ledge to enable removal of the scrubber from the socket.

7. The irrigation valve of claim 6 wherein the tab is arcuately elongated and longitudinally elongated to provide a prominent surface for a user to manually unlatch the latch from the ledge.

8. The irrigation valve of claim 1 wherein the scrubber includes a protrusion that seats in a complementary shaped channel of the socket, the arrangement orienting the scrubber with the socket.

9. An irrigation valve comprising:
a body defining an inlet and outlet, and a valve seat between the inlet and the outlet;

a diaphragm mounted at the body to engage the valve seat to prevent flow from the inlet to the outlet and to move away from the valve seat to allow flow between the inlet and the outlet;

a pressure chamber formed by the body and the diaphragm, the chamber controlling movement of the diaphragm depending on the pressure in the pressure chamber;

a solenoid controlling the pressure in the pressure chamber;

a flow path for fluid from the inlet to pass into the pressure chamber;

a filter attached to the diaphragm to filter debris from fluid flowing into the flow path, the filter moving with the diaphragm;

a scrubber fixed to the body, the scrubber having at least one scrubber arm that engages the filter to remove debris from the filter as the filter moves with the diaphragm; and the scrubber having at least one outward biased latch arm separate from the at least one scrubber arm, the latch arm having a latch and being manually movable by a user from a first position where the latch is interlocked with the body to a second position where the latch is free of the body;

the body comprises a support to mount the scrubber;

the support defines a socket to receive at least a portion of the scrubber;

the socket includes a ledge; and the latch directly engages the ledge when in the first position.

* * * * *